(12) United States Patent
Taherzadeh Boroujeni et al.

(10) Patent No.: US 11,997,726 B2
(45) Date of Patent: May 28, 2024

(54) BEAM-SPECIFIC COVERAGE ENHANCEMENT FOR RANDOM ACCESS PROCEDURE

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 17/395,853

(22) Filed: Aug. 6, 2021

(65) Prior Publication Data
US 2022/0046726 A1   Feb. 10, 2022

Related U.S. Application Data

(60) Provisional application No. 63/063,118, filed on Aug. 7, 2020.

(51) Int. Cl.
*H04W 74/0833* (2024.01)
*H04W 16/28* (2009.01)
*H04W 72/1263* (2023.01)

(52) U.S. Cl.
CPC ....... *H04W 74/0841* (2013.01); *H04W 16/28* (2013.01); *H04W 72/1263* (2013.01)

(58) Field of Classification Search
CPC ......... H04W 74/0841; H04W 74/0833; H04W 16/28; H04W 72/1263; H04W 48/12; H04B 7/0695; H04L 5/005; H04L 5/0053
See application file for complete search history.

(56) References Cited

U.S. PATENT DOCUMENTS

| | | | |
|---|---|---|---|
| 2017/0251460 A1* | 8/2017 | Agiwal | H04W 72/0406 |
| 2018/0027594 A1* | 1/2018 | Nagaraja | H04B 7/088 370/329 |
| 2018/0263064 A1* | 9/2018 | Islam | H04W 72/1205 |
| 2019/0053080 A1* | 2/2019 | Ryu | H04W 24/08 |
| 2019/0053271 A1* | 2/2019 | Islam | H04W 74/0866 |
| 2019/0159264 A1* | 5/2019 | Zhang | H04W 72/046 |
| 2020/0351950 A1* | 11/2020 | Liu | H04W 72/0453 |

FOREIGN PATENT DOCUMENTS

WO    WO-2018058574 A1 *   4/2018

* cited by examiner

*Primary Examiner* — Ricardo H Castaneyra
(74) *Attorney, Agent, or Firm* — Loza & Loza, LLP

(57) ABSTRACT

Aspects provide various beam-specific coverage enhancement techniques for a random access channel (RACH) procedure. A scheduling entity can apply a beam-specific coverage enhancement technique to one or more random access messages associated with a random access procedure. The beam-specific coverage enhancement technique can be selectively applied on a predetermined beam or a subset of beams.

18 Claims, 21 Drawing Sheets

BEAM-SPECIFIC COVERAGE ENHANCEMENT FOR RANDOM ACCESS PROCEDURE

PRIORITY CLAIM

This application claims priority to and the benefit of provisional patent application No. 63/063,118 filed in the United States Patent Office on Aug. 7, 2020 and provisional patent application No. 63/063,124 filed in the United States Patent Office on Aug. 7, 2020, the entire content of each application is incorporated herein by reference as if fully set forth below in its entirety and for all applicable purposes.

TECHNICAL FIELD

The technology discussed below relates generally to wireless communication systems, and more particularly, to beam-specific coverage enhancement for a random access procedure.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). A UE can use a random access channel (RACH) procedure to gain access to a wireless network. Using the RACH procedure, the UE can achieve synchronization with the network and obtain communication resources to communicate with the network. Some NR networks may use beamforming to improve signal coverage, for example, during the RACH procedure.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a method of wireless communication at a user equipment (UE). The method includes receiving, from a scheduling entity, system information in a beam sweep including a plurality of beams. The method further includes identifying, based on the system information, one or more beams of the plurality of beams configured to use a coverage enhancement technique in a random access procedure. The method further includes exchanging, with the scheduling entity, at least one random access message associated with the random access procedure on the one or more beams according to the coverage enhancement technique.

Another aspect of the disclosure provides a user equipment (UE) for wireless communication. The UE includes a communication interface, a memory, and a processor operatively coupled with the communication interface and the memory. The processor and the memory are configured to receive, via the communication interface, system information transmitted by a scheduling entity in a beam sweep including a plurality of beams. The processor and the memory are further configured to identify, based on the system information, one or more beams of the plurality of beams configured to use a coverage enhancement technique in a random access procedure. The processor and the memory are further configured to exchange, via the communication interface, with the scheduling entity, at least one random access message associated with the random access procedure on the one or more beams according to the coverage enhancement technique.

Another aspect of the disclosure provides a method of wireless communication at a scheduling entity. The method includes transmitting system information in a beam sweep including a plurality of beams, the system information identifying one or more beams of the plurality of beams configured to use a coverage enhancement technique in a random access procedure. The method further includes receiving, from a user equipment (UE), a random access request associated with the random access procedure. The method further includes transmitting, to the UE, a random access response (RAR) associated with the random access procedure. At least one of the random access request or the RAR is configured according to the coverage enhancement technique corresponding to the one or more beams.

Another aspect of the disclosure provides a scheduling entity for wireless communication. The scheduling entity includes a communication interface, a memory, and a processor operatively coupled with the communication interface and the memory. The processor and the memory are configured to transmit, via the communication interface, system information in a beam sweep including a plurality of beams, the system information identifying one or more beams of the plurality of beams configured to use a coverage enhancement technique in a random access procedure. The processor and the memory are further configured to receive, via the communication interface, from a user equipment (UE), a random access request associated with the random access procedure. The processor and the memory are further configured to transmit, via the communication interface to the UE, a random access response (RAR) associated with the random access procedure. At least one of the random access request or the RAR is configured according to the coverage enhancement technique corresponding to the one or more beams.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In similar fashion, while exemplary implementations may be discussed below as device, system, or method implementations, it should be understood that such exemplary implementations can be implemented in various devices, systems, and methods.

DETAILED DESCRIPTION

Figure 1:
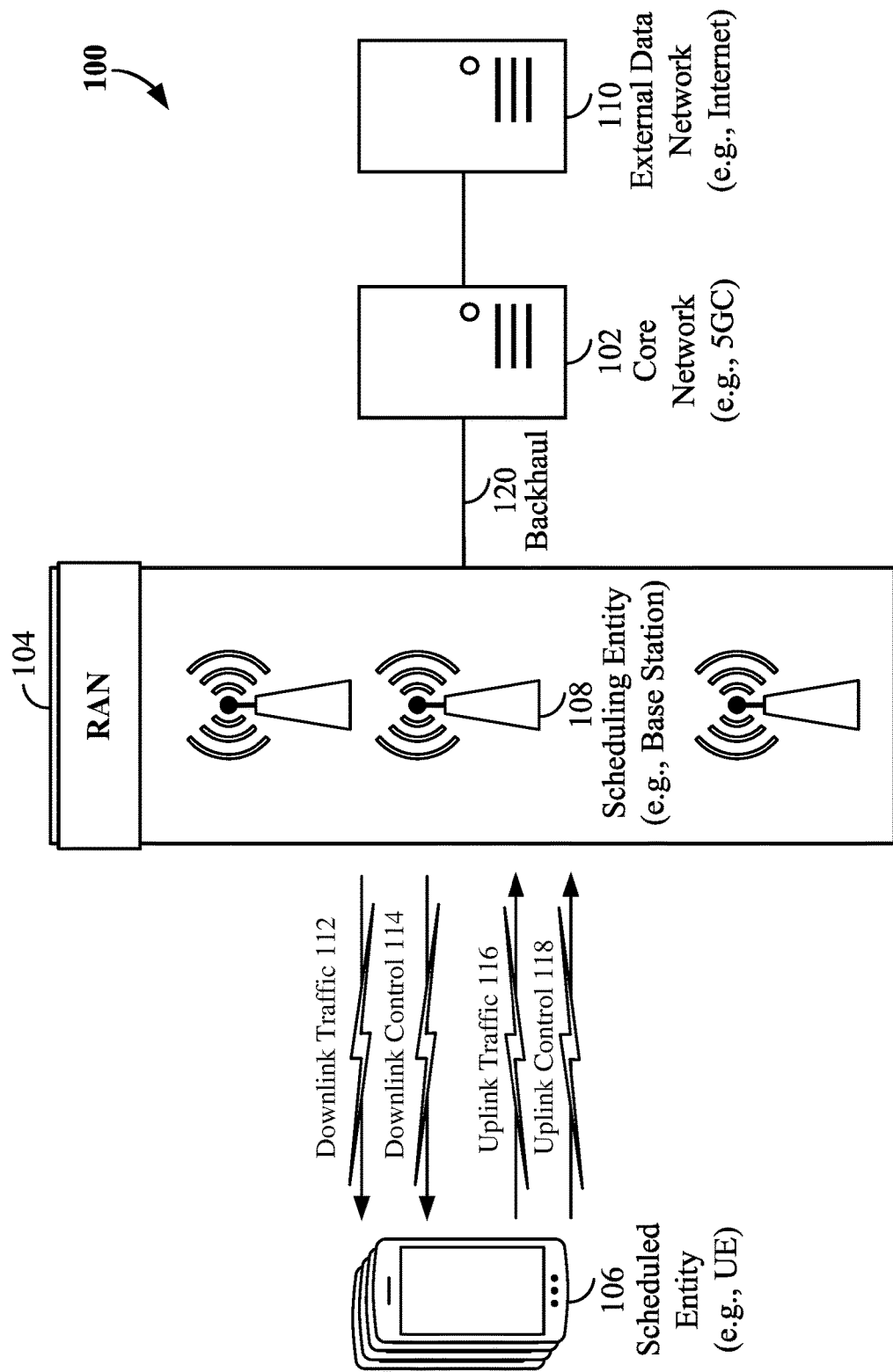
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described implementations. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The electromagnetic spectrum is often subdivided, based on frequency/wavelength, into various classes, bands, channels, etc. In 5G NR two initial operating bands have been identified as frequency range designations FR1 (410 MHz- 7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Aspects of the present disclosure provide various beam-specific coverage enhancement techniques that can be used in a random access channel (RACH) procedure. In some aspects, the network may use the coverage enhancement techniques for broadcast channels, for example, using millimeter waves (e.g., FR4 and FR5). In one aspect, a scheduling entity can apply a beam-specific coverage enhancement technique to control information associated with a RACH procedure. The beam-specific coverage enhancement technique can be selectively applied when the scheduling entity transmits the control information on a predetermined beam or a subset of beams. In one aspect, the scheduling entity can indicate the application of beam-specific coverage enhancement technique using system information (e.g., the remaining minimum system information (RMSI)).

Aspects relate to techniques that support beam-specific coverage enhancement for a RACH procedure. Generally, the described techniques provide for a more robust random access procedure between a user equipment (UE) and a base station. In some wireless communications systems, a UE may attempt to connect to a base station using a random access procedure and transmit a random access request to the base station. The base station may respond to the random access request by transmitting, to the UE, a random access response (RAR) during an RAR window. In some aspects, the base station may transmit control information of the RAR using coverage enhancement techniques for a specific beam or a set of beams. An exemplary coverage enhancement technique is repetition of the random access control information on a specific beam or a subset of beams. Repeated transmission of the control information can increase the likelihood that a receiver can successfully receive the control information in a random access procedure.

For some frequency bands, such as FR2 and higher, some broadcast channels and stages of initial access and RACH procedures may need coverage enhancement, which includes procedures such as repeat transmissions of a RACH message or the modification of the format of the RACH message to better ensure success for the initial access procedure. Additionally, the need for coverage enhancement may depend on a synchronization signal block (SSB) beam, as there may be worse channel conditions in some beam directions or the signal needs to reach larger distances in certain beam directions. Accordingly, enhanced coverage procedures that accommodate for different SSB beams from a base station are disclosed herein.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 118 and/or 114 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
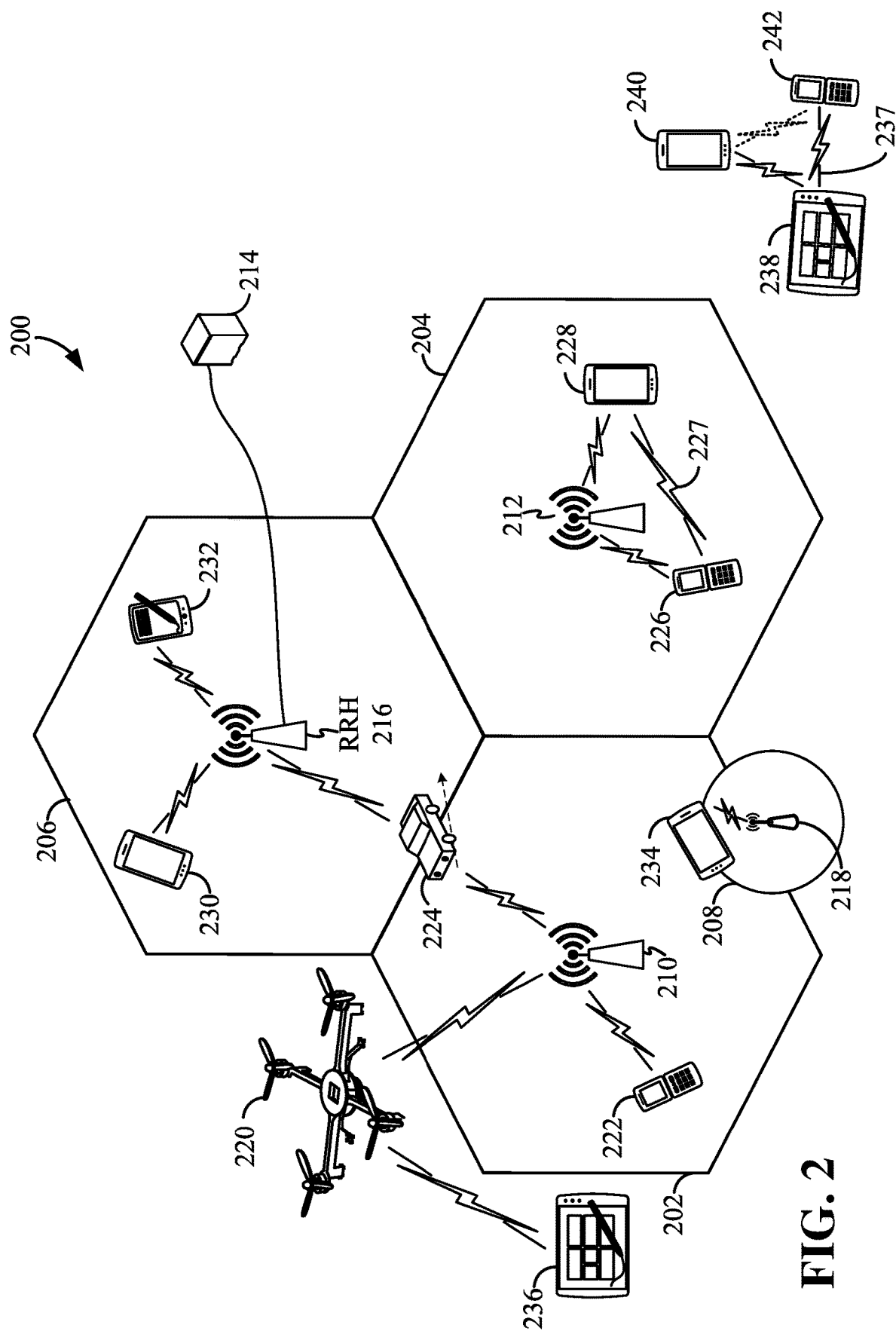
FIG. 2 is an illustration of an example of a radio access network according to some aspects of the disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (I-DMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
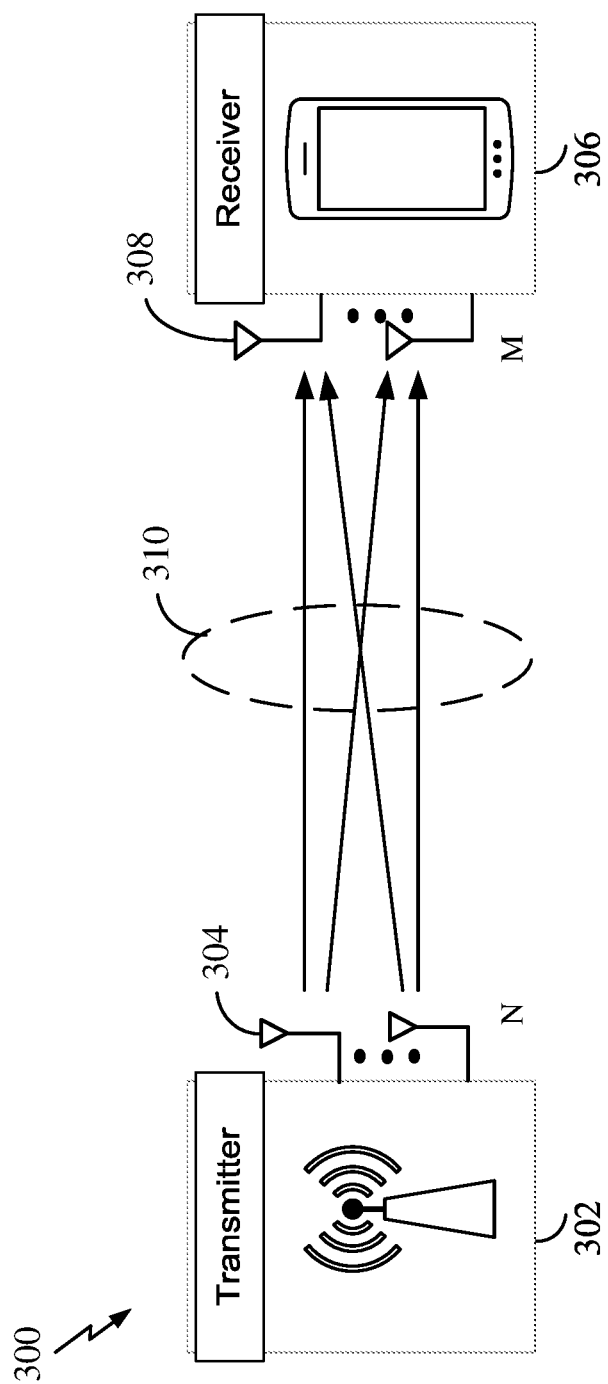
FIG. 3 is a block diagram illustrating a wireless communication system supporting multiple-input multiple-output (MIMO) communication according to some aspects of the disclosure.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306.

In 5G New Radio (NR) systems, particularly for millimeter wave (e.g., FR2, FR4, FR5) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems. In addition, beamformed signals may further be utilized in D2D systems, such as NR sidelink (SL) or V2X, utilizing FR2.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
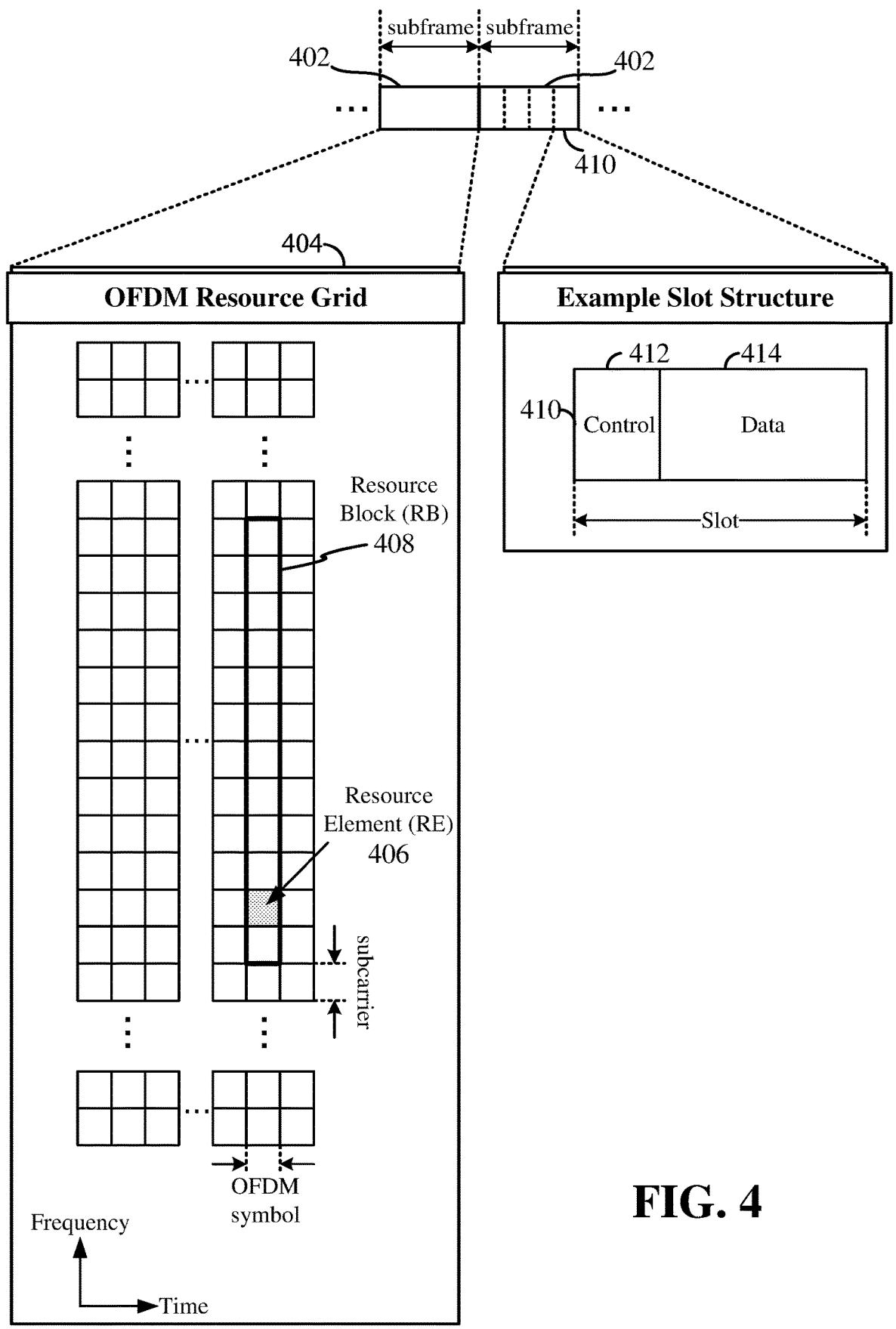
FIG. 4 is a schematic illustration of an organization of wireless resources in an air interface utilizing orthogonal frequency divisional multiplexing (OFDM) according to some aspects of the disclosure.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

In order for a UE to gain initial access to a cell, the network (e.g., RAN 200) may provide system information (SI) and/or control information characterizing the cell. In some aspects, the network can provide system information using minimum system information (MSI) and/or other system information (OSI). The MSI may be periodically broadcast over the cell to provide the basic information used for initial cell access, and for acquiring any OSI that may be broadcast periodically or sent on-demand. In some examples, the network may provide MSI over different downlink channels. For example, the PBCH may carry a master information block (MIB), and the PDSCH may carry a system information block type 1 (SIB1). In the art, SIB1 may be referred to as the remaining minimum system information (RMSI). After a successful MIB decode, the UE can get the information regarding the Control Resource Set 0 (CORSETO) and PDCCH search space to obtain the scheduling information (e.g., PDSCH resources allocated) for the SIB1. SIB1 provides network access parameters along with scheduling information about all other system information (SIB2, SIB3, . . . , etc.).

In some aspects, OSI may include any SI that is not included in the MSI. In some examples, the PDSCH may carry a plurality of SIBs, not limited to SIB1, discussed above. Here, the OSI may be provided in these SIBs, e.g., SIB2 and above. In some examples, RMSI may provide information for beam-specific coverage enhancement of control information associated with an initial access procedure (e.g., RACH procedure) of the RAN 200.

To access a cell, a UE (e.g., scheduled entity 106) first acquires time and frequency synchronization with a cell (e.g., RAN 200) and decodes the Cell ID of that cell. In a 5G NR network, the UE tunes to a specific frequency of the cell and tries to detect the synchronization signals (e.g., PSS and SSS) broadcasted by the cell. The UE can decode the PSS and SSS to obtain the Cell ID. Once the UE successfully detects the PSS/SSS, the UE tries to decode the PBCH that carries the MSI (e.g., MIB). The MSI in the PBCH may include, for example, scheduling information indicating time-frequency resources allocated for a COERSETO. In some examples, the CORESETO may be transmitted within the first four symbols (e.g., within a control region) of a slot. In addition, the CORESETO carries a PDCCH with DCI that contains scheduling information for scheduling the SIB1. The SIB1 including the RMSI is carried within a physical downlink shared channel (PDSCH). Therefore, once the UE successfully decodes the PBCH, the UE tries to decode the PDCCH to obtain the scheduling information for the PDSCH carrying the SIB1 including RMSI and any OSI (e.g., other SIBs). In 5G NR, the network (e.g., base station or scheduling entity 108) can transmit PSS, SSS, and PBCH in an SS Block (SSB). In one example, an SSB is consist of four symbols (1-symbol PSS, 1-symbol SSS, and 2-symbol PBCH). The scheduling entity 108 (e.g., gNB or base station) can transmit a number of SSBs in a batch in the form of an SS Burst (e.g., one SSB per beam) that is used during beam sweeping by changing the beam direction for each SSB transmission. The UE can measure and identify the best beam from the SSB beam sweep.

Beamforming Communication

Figure 5:
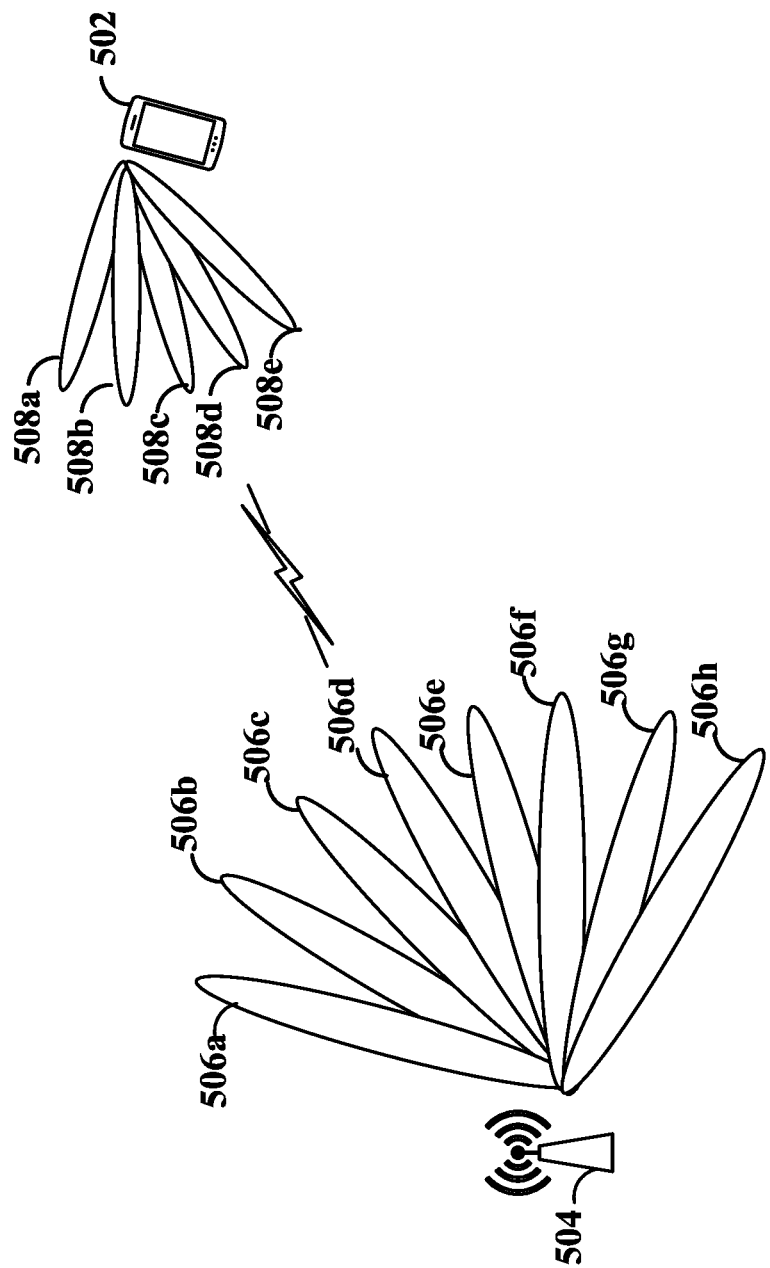
FIG. 5 is a diagram illustrating communication between a base station and a user equipment (UE) using beamformed signals according to some aspects of the disclosure.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 2, and the UE 502 may be any of the UEs or scheduled entities illustrated in FIGS. 1 and/or 2.

The base station 504 may generally be capable of communicating with the UE 502 using one or more transmit beams, and the UE 502 may further be capable of communicating with the base station 504 using one or more receive beams. As used herein, the term transmit beam refers to a beam on the base station 504 that may be utilized for downlink or uplink communication with the UE 502. In addition, the term receive beam refers to a beam on the UE 502 that may be utilized for downlink or uplink communication with the base station 504.

In the example shown in FIG. 5, the base station 504 is configured to generate a plurality of transmit beams 506a-506h, each associated with a different spatial direction. In addition, the UE 502 is configured to generate a plurality of receive beams 508a-508e, each associated with a different spatial direction. It should be noted that while some beams are illustrated as adjacent to one another, such an arrangement may be different in different aspects. For example, transmit beams 506a-506h transmitted during a same symbol may not be adjacent to one another. In some examples, the base station 504 and UE 502 may each transmit more or less beams distributed in all directions (e.g., 360 degrees) and in three-dimensions. In addition, the transmit beams 506a-506h may include beams of varying beam width. For example, the base station 504 may transmit certain signals (e.g., SSBs) on wider beams and other signals (e.g., CSI-RSs) on narrower beams.

The base station 504 and UE 502 may select one or more transmit beams 506a-506h on the base station 504 and one or more receive beams 508a-508e on the UE 502 for communication of uplink and downlink signals therebetween using a beam management procedure. In one example, during initial cell acquisition, the UE 502 may perform a P1 beam management procedure to scan the plurality of transmit beams 506a-506h on the plurality of receive beams 508a-508e to select a beam pair link (e.g., one of the transmit beams 506a-506h and one of the receive beams 508a-508e) for a physical random access channel (PRACH) procedure for initial access to the cell. For example, periodic SSB beam sweeping may be implemented on the base station 504 at certain intervals (e.g., based on the SSB periodicity). Thus, the base station 504 may be configured to sweep or transmit an SSB on each of a plurality of wider transmit beams 506a-506h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 504 and UE 502 may perform a P2 beam management procedure for beam refinement at the base station 504. For example, the base station 504 may be configured to sweep or transmit a CSI-RS on each of a plurality of narrower transmit beams 506a-506h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 502 is configured to scan the plurality of CSI-RS transmit beams 506a-506h on the plurality of receive beams 508a-508e. The UE 502 then performs beam measurements (e.g., RSRP, SINR, etc.) of the received CSI-RSs on each of the receive beams 508a-508e to determine the respective beam quality of each of the CSI-RS transmit beams 506a-506h as measured on each of the receive beams 508a-508e.

The UE 502 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 506a-506h on one or more of the receive beams 508a-508e to the base station 504. The base station 504 may then select one or more CSI-RS transmit beams on which to communicate downlink and/or uplink control and/or data with the UE 502. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 502 may further select a corresponding receive beam on the UE 502 for each selected serving CSI-RS transmit beam to form a respective beam pair link (BPL) for each selected serving CSI-RS transmit beam. For example, the UE 502 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 504 may configure the UE 502 to perform SSB beam measurements and provide an L1 measurement report containing beam measurements of SSB transmit beams 506a-506h. For example, the base station 504 may configure the UE 502 to perform SSB beam measurements and/or CSI-RS beam measurements for beam failure detection (BRD), beam failure recovery (BFR), cell reselection, beam tracking (e.g., for a mobile UE 502 and/or base station 504), or other beam measurement and/or optimization purpose.

In addition, when the channel is reciprocal, the transmit and receive beams may be selected using an uplink beam management scheme. In an example, the UE 502 may be configured to sweep or transmit on each of a plurality of receive beams 508a-508e. For example, the UE 502 may transmit an SRS on each beam in the different beam directions. In addition, the base station 504 may be configured to receive the uplink beam reference signals on a plurality of transmit beams 506a-506h. The base station 504 then performs beam measurements (e.g., RSRP, SINR, etc.) of the beam reference signals on each of the transmit beams 506a-506h to determine the respective beam quality of each of the receive beams 508a-508e as measured on each of the transmit beams 506a-506h.

The base station 504 may then select one or more transmit beams on which to communicate downlink and/or uplink control and/or data with the UE 502. In some examples, the selected transmit beam(s) have the highest RSRP. The UE 502 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 506d) on the base station 504 and a single receive beam (e.g., beam 508c) on the UE may form a single BPL used for communication between the base station 504 and the UE 502. In another example, multiple CSI-RS transmit beams (e.g., beams 506c, 506d, and 506e) on the base station 504 and a single receive beam (e.g., beam 508c) on the UE 502 may form respective BPLs used for communication between the base station 504 and the UE 502. In another example, multiple CSI-RS transmit beams (e.g., beams 506c, 506d, and 506e) on the base station 504 and multiple receive beams (e.g., beams 508c and 508d) on the UE 502 may form multiple BPLs used for communication between the base station 504 and the UE 502. In this example, a first BPL may include transmit beam 506c and receive beam 508c, a second BPL may include transmit beam 508d and receive beam 508c, and a third BPL may include transmit beam 508e and receive beam 508d.

Figure 6:
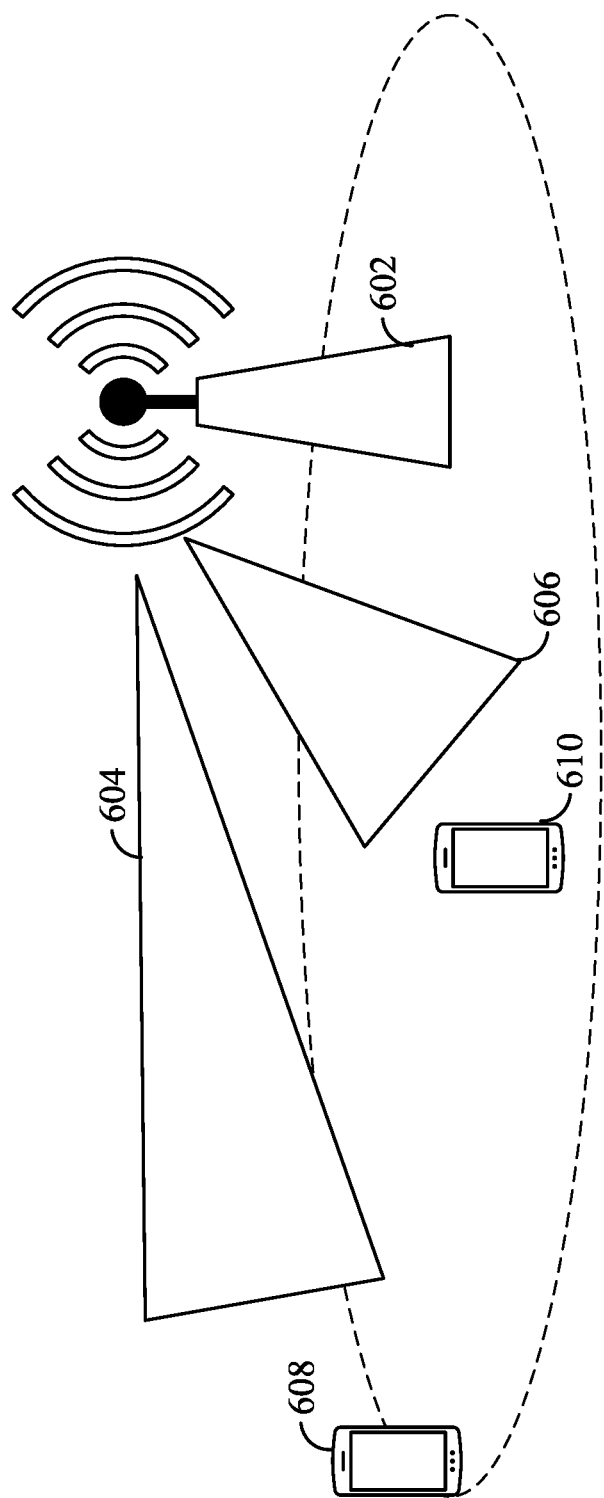
FIG. 6 is a diagram illustrating a first beamforming example according to some aspects of the disclosure.
Figure 7:
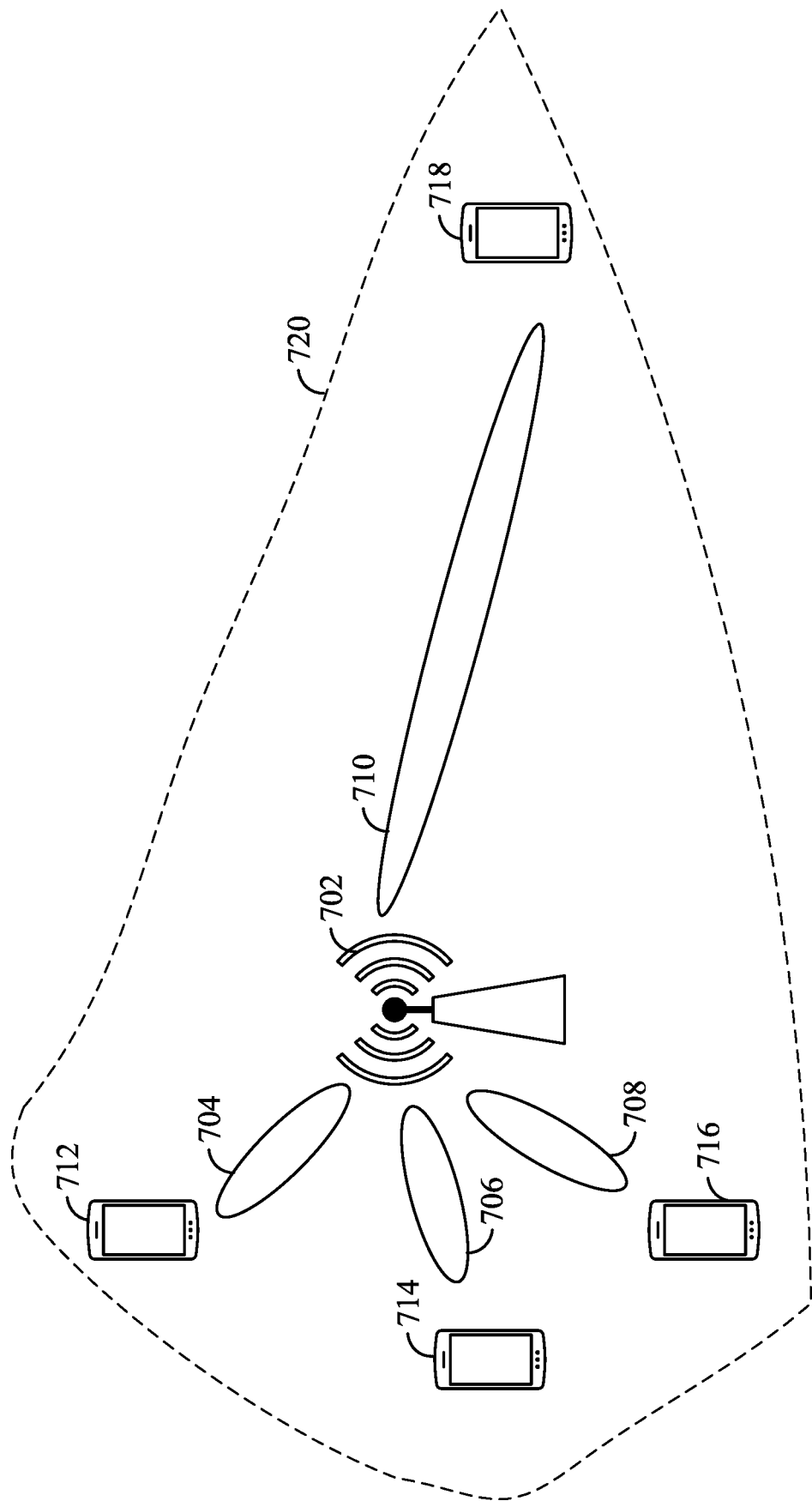
FIG. 7 is a diagram illustrating a second beamforming example according to some aspects of the disclosure.

FIGS. 6 and 7 are diagrams illustrating exemplary scenarios in which coverage enhancement can be used in a wireless network using beamforming. FIG. 6 is a diagram illustrating a first example of beamforming communication according to some aspects of the disclosure. A scheduling entity 602 (e.g., gNB or base station) can broadcast SSBs in a two-dimensional beam sweep. Two exemplary beam sets 604 and 606 are illustrated in FIG. 6. In some networks, the upper beams (e.g., beam set 604) may be configured to reach UEs 608 at a larger distance, for example, in a suburban environment while the lower beams (e.g., beam set 606) can cover UEs (e.g., UE 610) closer to the scheduling entity 602. In this case, broadcast channels and stages of initial access (e.g., RACH procedures) can use coverage enhancement techniques, in particular, for millimeter-wave (e.g., FR2, FR4, and FR5) NR.

FIG. 7 is a diagram illustrating a second example of beamforming communication according to some aspects of the disclosure. A scheduling entity 702 (e.g., gNB or base station) can broadcast SSBs in a beam sweep (e.g., beams 704, 706, 708, and 710) to different UEs (e.g., UEs 712, 714, 716, and 718) in a cell 720. In this example, the cell 720 may have an irregular cell shape. Some beams (e.g., beam 710) may be configured to provide an extended coverage to reach UEs (e.g., UE 718) further away than UEs 712, 714, and 716. As illustrated in FIGS. 6 and 7, coverage enhancement techniques for certain beam(s) or beam directions can be used during an initial access procedure.

Figure 8:
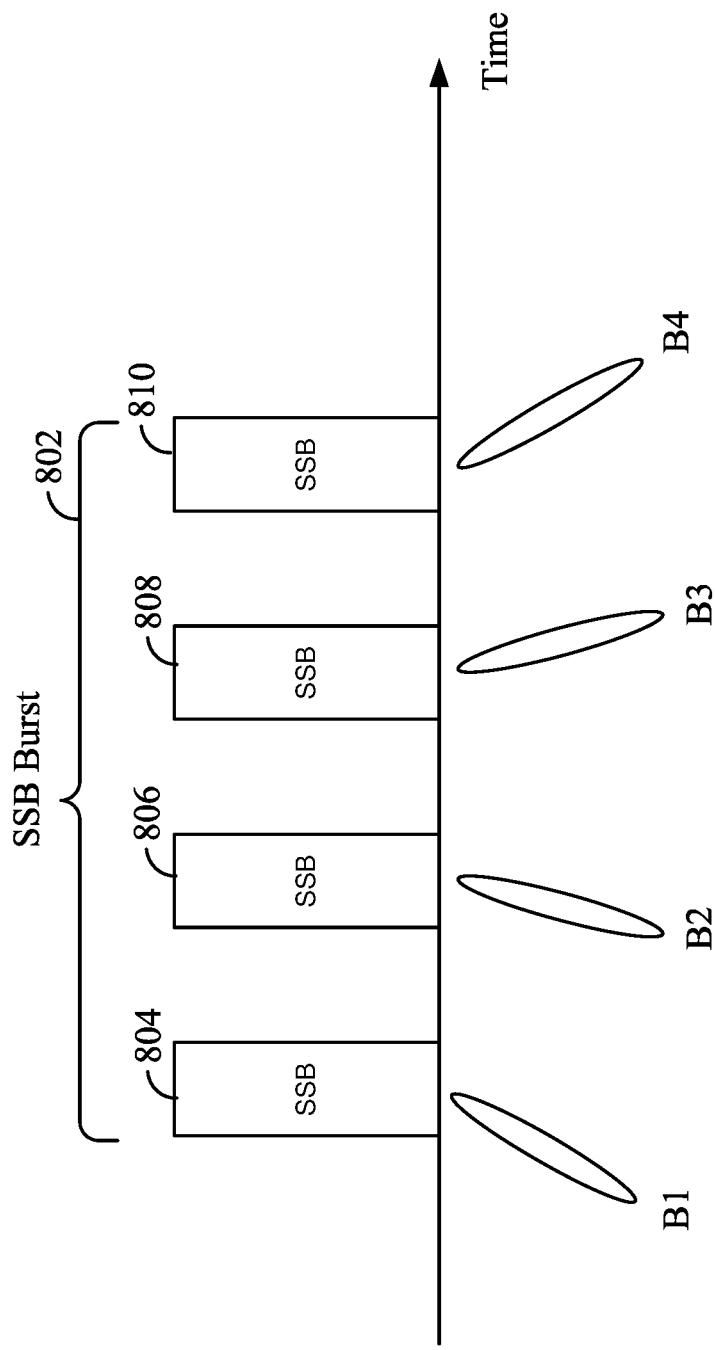
FIG. 8 is a diagram illustrating an exemplary synchronization signal block (SSB) burst according to some aspects of the disclosure.

FIG. 8 is a diagram illustrating exemplary SSB transmissions in the time domain according to some aspects of the disclosure. A scheduling entity (e.g., gNB) can broadcast an SSB burst 802 having a number of SSBs using different beams (e.g., conceptually illustrated as beams B1, B2, B3, and B4) or beam directions. Each SSB has a corresponding beam (e.g., beam B1 for a first SSB 804, beam B2 for a second SSB 806, beam B3 for a third SSB 808, and beam B4 for a fourth SSB 810) with a different direction. Four exemplary SSBs are illustrated in FIG. 8. Each SSB can have a different beam direction and can be identified by a unique SSB index or beam index. A UE or scheduled entity 106 can measure the signal strength of each SSB, for example, by measuring a reference signal (e.g., DM-RS) included in the PBCH of the SSB. From the measurements, the UE can identify the SSB beam with the best or the strongest signal strength. The SSB beam with the strongest signal strength may be the best beam for communicating with the UE. The UE chooses the best beam and attempts to decode the PBCH contents including, for example, SSB index, scheduling information, etc. Successful decode of the PBCH enables reception of the subsequent PDCCH and PDSCH, which carries the RMSI and OSI. The PBCH provides information on the configuration of the PDCCH for an initial access procedure (e.g., RACH procedure). For example, the PBCH can indicate the CORESET0 and search space for monitoring the PDCCH.

Figure 9A:
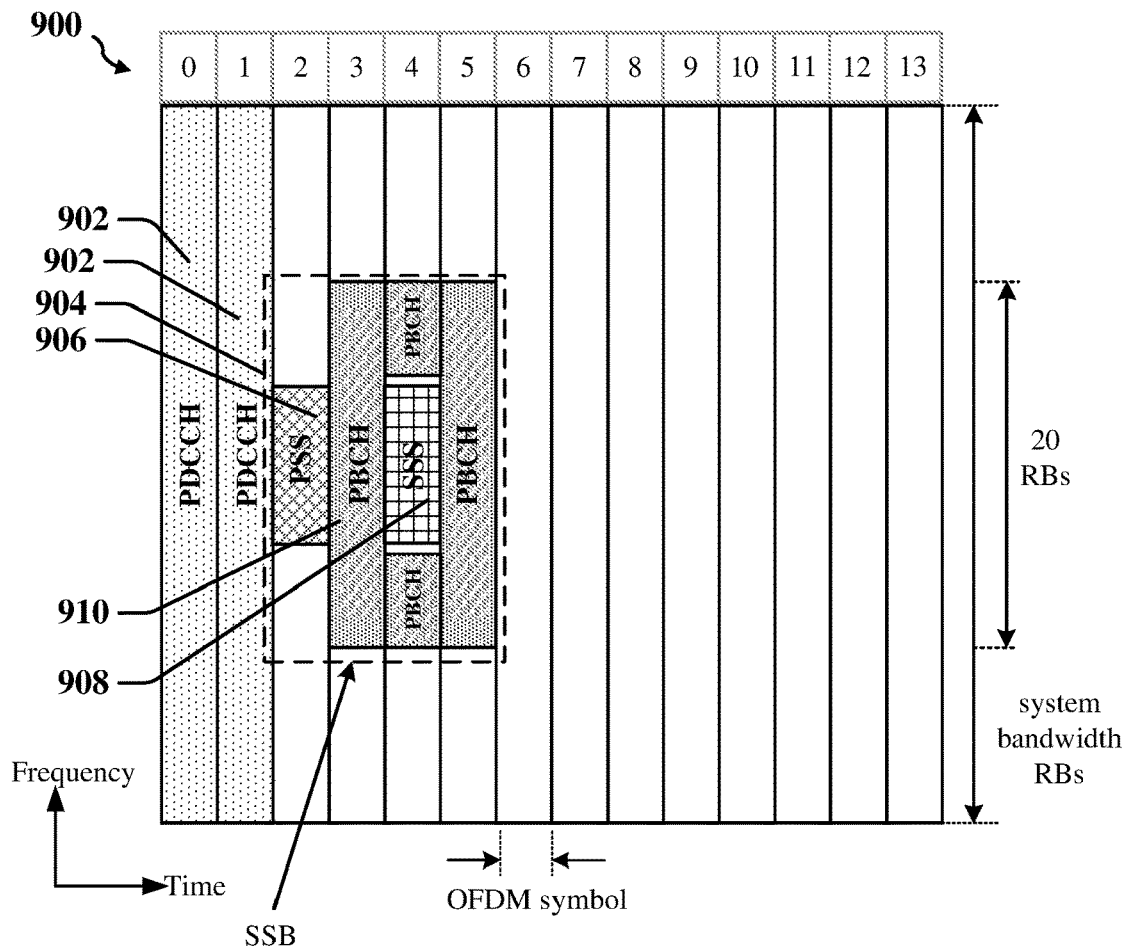
FIG. 9A is a diagram illustrating an example of a frame structure of synchronization signals for use in a wireless communication network according to some aspects of the disclosure.

FIG. 9A illustrates an example 900 of various downlink channels within a subframe of a frame including channels used for initial access and synchronization. In example, the subframe may be the subframe 402 of FIG. 4. As shown in FIG. 9A, a PDCCH 902 is transmitted in at least two symbols (e.g., symbol 0 and symbol 1) and may carry DCI within one or more control channel elements (CCEs), with each CCE including nine RE groups (REGs), and each REG including four consecutive REs in an OFDM symbol. Additionally, FIG. 9A illustrates an exemplary synchronization signal block (SSB) 904 that may be periodically transmitted by a scheduling entity (e.g., base station or gNB). The SSB 904 carries synchronization signals PSS 906 and SSS 908 and broadcast channels (PBCH) 910. In this example, the SSB 904 contains one PSS symbol (shown in symbol 2), one SSS symbol (shown in symbol 4) and two PBCH symbols (shown in symbols 3 and 5). The PSS and SSS combination may help to identify about 1008 physical cell identities. The PSS is used by a UE to determine subframe/symbol timing and a physical layer identity. The SSS is used by a UE to determine a physical layer cell identity group number and radio frame timing. Based on the physical layer identity and the physical layer cell identity group number, the UE can determine a physical cell identifier (PCI). Also, based on the PCI, the UE can determine the locations of the demodulation reference signal (DM-RS). The PBCH, which carries a master information block (MIB), is logically grouped with the PSS and SSS to form the synchronization signal (e.g., SSB 904). The MIB provides a number of RBs in the system bandwidth and a system frame number (SFN).

Figure 9B:
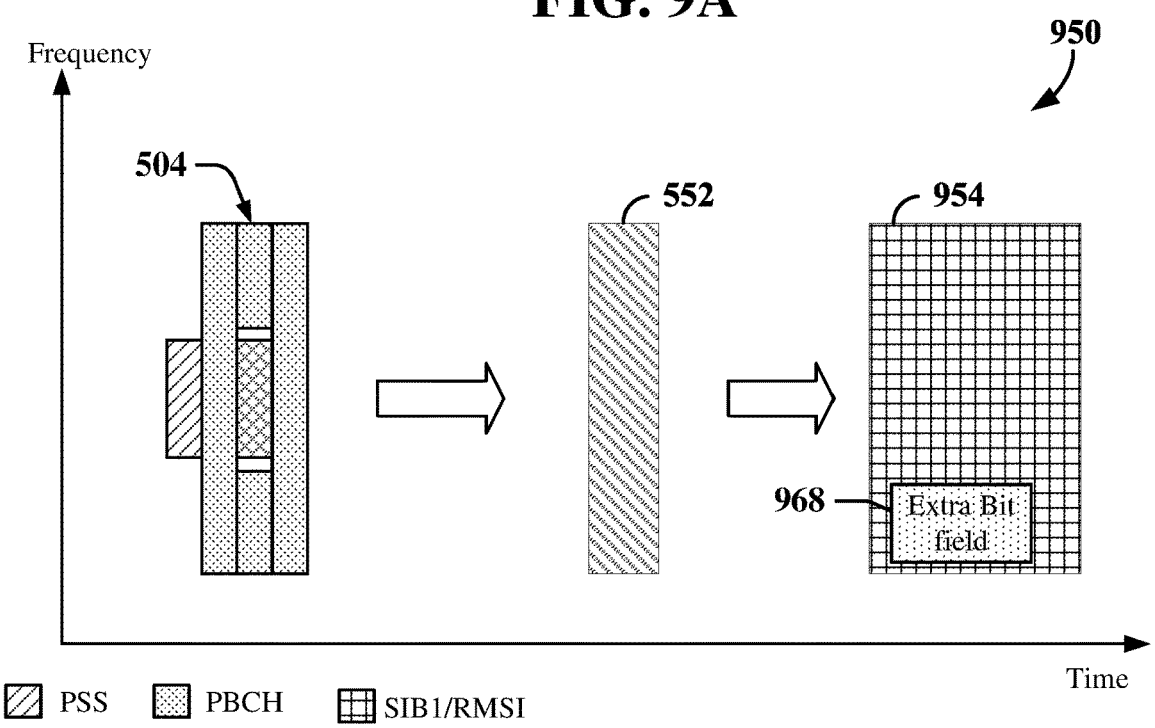
FIG. 9B is a diagram illustrating an example of a portion of a frame or subframe structure with various channels and associated messages for use in a wireless communication network according to some aspects of the disclosure.

The PDSCH carries user data, broadcast system information not transmitted through the PBCH such as system information blocks (SIBs), and paging messages. As an example, FIG. 9B is a diagram illustrating various broadcast information 950 related to initial cell access according to some examples. The broadcast information 950 may be transmitted by a RAN node (e.g., a base station, such as an eNB or gNB) on resources (e.g., time-frequency resources) allocated for the transmission of the broadcast information 950 in a cell. The broadcast information 950 includes SSB 904 illustrated in FIG. 9A. It is noted that the PBCH in SSB 904 includes the MIB carrying various system information (SI) including, for example, a cell barred indication, the subcarrier spacing, the system frame number, and scheduling information for a CORESET0 952. For example, the PBCH in SSB 904 may include scheduling information indicating time-frequency resources allocated for the COERSET0 952. In some examples, the CORESET0 952 may be transmitted within the first four symbols (e.g., within a control region) of a slot. In addition, the CORESET0 952 carries a PDCCH with DCI that contains scheduling information for scheduling the SIB1 954. The SIB1 954 is carried within a PDSCH within a data region of a slot. In addition, the SIB1 954 contains the RMSI including, for example, a set of radio resource parameters providing network identification and configuration. For example, the set of radio resource parameters may include a bandwidth (e.g., number of BWPs) on which a UE may communicate with a base station.

FIG. 9B also illustrates that RMSI in SIB1 message 954 may also employ the use of an extra bit field 968 in the RMSI. The time/frequency location of this bit field 968 is merely exemplary to show that this bit field 968 utilizes some of the time and frequency resources of the SIB1 message 954.

The physical channels shown in FIGS. 4, 9A, and 9B are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

In order for a UE to gain initial access to the network (e.g., a base station or gNB), the network may provide system information (SI) or control information characterizing the cell. This system information may be provided utilizing MSI, and other system information (OSI). The MSI may be periodically broadcast over the cell to provide the basic information needed for initial cell access, and for acquiring any OSI that may be broadcast periodically or sent on-demand. In some examples, the MSI may be provided over two different downlink channels. For example, the PBCH may carry a master information block (MIB), and a PDSCH may carry the SIB1, which may include remaining minimum system information (RMSI). After successful MIB decoding, the UE obtains information regarding a Control Resource Set (CORSET) and a PDCCH search space required for SIB1 decoding. The SIB1 provides network access parameters along with scheduling information about all other system information (SIB2, SIB3, . . . , etc.). In some examples, the PDSCH may carry a plurality of SIBs as mentioned before with regard to FIG. 5B, and is not limited to the SIB1 as discussed above. In some other examples, RMSI may provide control information for beam-specific coverage enhancement of the PDCCH during the initial access of the network (e.g., RAN 200).

Figure 10:
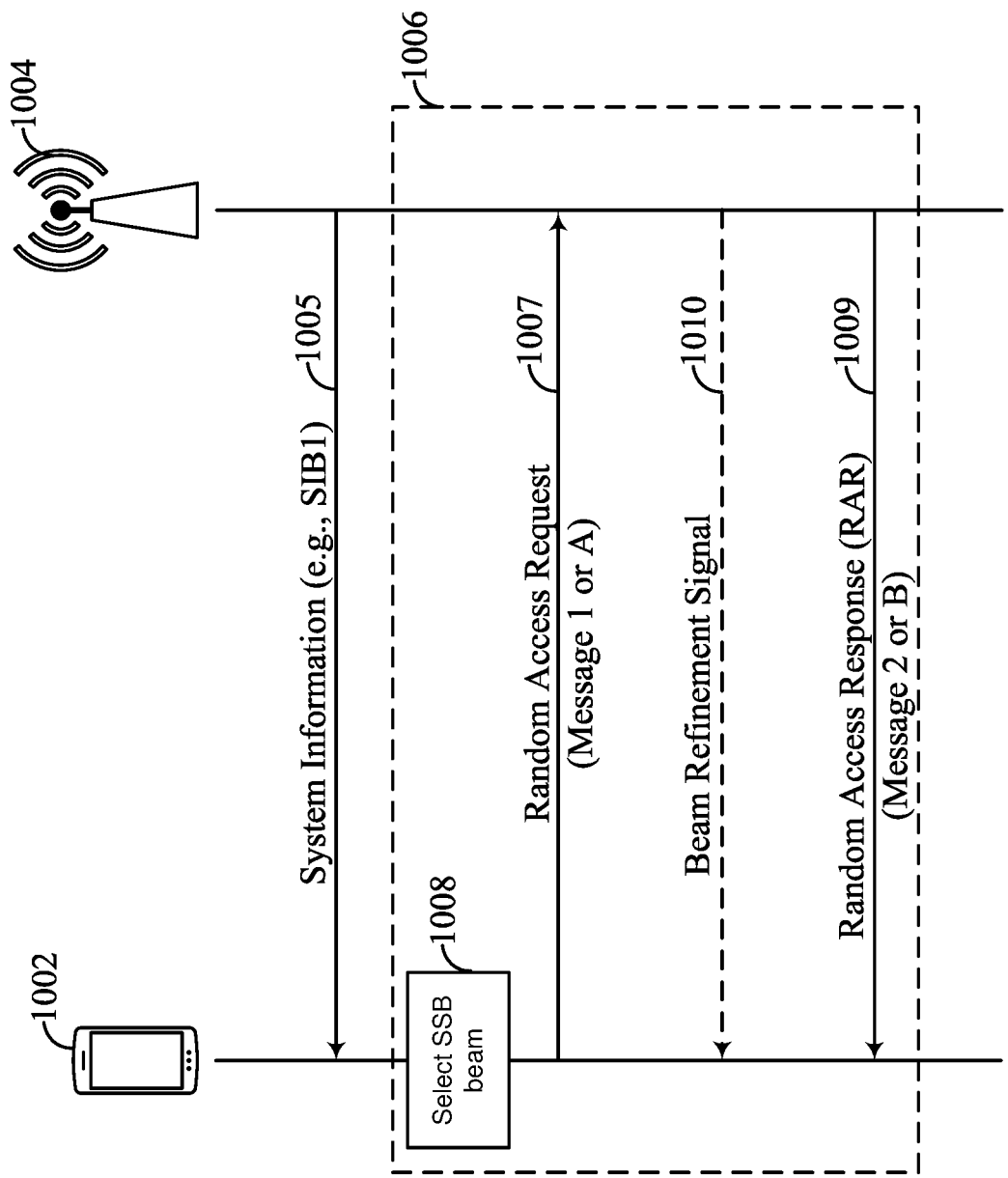
FIG. 10 is a schematic illustration of a random access procedure with beam specific coverage enhancement according to some aspects of the disclosure.

In some aspects of the disclosure, coverage enhancement may be applied in a RACH procedure for a specific SSB beam or a subset of SSB beams. FIG. 10 is a schematic illustration of a random access procedure with beam specific coverage enhancement according to some aspects of the disclosure. A UE 1002 may attempt to connect to a scheduling entity 1004 using an initial access procedure (e.g., a RACH procedure). After the UE receives and decodes system information 1005 (e.g., SSB, SIB1) from the scheduling entity, the UE may identify a random access search space including PRACH resources for initiating a RACH procedure from the SIB1. The UE may perform the RACH procedure 1006 in various scenarios, such as loss of uplink synchronization, lack of available PUCCH resources, scheduling request failure, and other use cases. In addition, a RACH procedure may be contention-based or contention-free, and may include a 2-step RACH process or a 4-step RACH process. In the 4-step RACH process, the UE and the scheduling entity can perform two cycles of message exchanges involving four messages (e.g., messages 1, 2, 3, and 4); while in the 2-step RACH process, the UE and the scheduling entity can perform one cycle of message exchange involving two messages (e.g., messages A and B).

In one example, to initiate the RACH procedure 1006, the UE 1002 may transmit a random access request 1007 (e.g., a message 1 or message A) associated with the random access procedure to the scheduling entity 1004. For example, the random access request 1007 may include a physical random access channel (PRACH) preamble to the scheduling entity to indicate the resource requirement of the UE for the random access procedure. At 1008, the UE 1002 can select a beam for transmitting the random access request 1007 based on beam measurements (e.g., RSRP, RSRQ, and/or SINR) performed by the UE on a plurality of beams (e.g., SSB beams of FIG. 8) or beam sweep. The beam may correspond, for example, to an SSB beam. The scheduling entity 1004 may acknowledge the random access request 1007 by transmitting a random access response (RAR) 1009 (e.g., message 2 or message B) associated with the random access procedure. The UE 1002 may expect to receive the RAR 1009 during a predetermined time window or interval (e.g., an RAR window). For example, the RAR 1009 may include a PDCCH and a PDSCH. The RAR message 1009 (PDCCH+PDSCH) can include an identifier of the preamble sent by the UE, a Timing Advance (TA), a temporary cell radio network temporary identifier (TC-RNTI) or random access (RA) RNTI for the UE, and a grant of assigned uplink (UL) resources. A MAC control element (MAC-CE) within the PDSCH can provide an acknowledgement of the reception of the random access request (e.g., message 1 or message A) and the UL grant. The scheduling entity may transmit downlink control information (DCI) via the message 2 PDCCH to indicate a resource location (e.g., frequency and time resources) where the UE may receive the RAR PDSCH data.

In some cases, the UE 1002 and the scheduling entity 1004 may be in a low connectivity condition in certain beam directions. For example, the scheduling entity may transmit control information (e.g., PDCCH) of the RAR using a beam (e.g., beams 804 B1 and 810 B4) that may be in a low connectivity condition for a variety of reasons, such as beam width and environmental factors (e.g., separation distance, signal obstruction, etc.). Such conditions may result in an increase in communication failures over the communication link. Therefore, the UE may be unable to receive and/or decode the RAR control information 1008 (e.g., message 2 or message B in PDCCH) transmitted by the scheduling entity. In such examples, the random access procedure may fail, and the UE 1002 and the scheduling entity 1004 may not be able to establish a communication link using a RACH procedure.

Aspects of the present disclosure provide various beam-specific coverage enhancement techniques for a RACH a procedure. In one aspect, the scheduling entity can apply a beam-specific coverage enhancement technique to control information associated with a random access procedure. The beam-specific coverage enhancement technique is selectively applied when a scheduling entity transmits the control information (PDCCH in message 2 or B) on a predetermined beam or a subset of beams. In one example, the scheduling entity can indicate the application of beam-specific coverage enhancement technique using system information (e.g., the remaining minimum system information (RMSI)).

Beam-Specific Coverage Enhancement Using Repetition

In one example, a beam-specific coverage enhancement technique may repeat the control information (e.g., PDCCH of message 2 or message B) of a RACH message (e.g., RAR) associated with the random access procedure. To that end, the scheduling entity can transmit multiple instances (i.e., repetition) of the PDCCH of message 2 or message B for a specific beam or a subset of beams. In some aspects, the UE 1002 and the scheduling entity 1004 may configure the RAR window for a specific SSB beam or a subset of SSB beams (e.g., beams 604 and 710) to enable repetition of the PDCCH of message 2 or message B. During the RAR window of a beam, the UE may identify and combine (e.g., using soft combining) multiple instances of the control information (e.g., repeated PDCCH of message 2 or message B) to improve the likelihood that the UE can successfully decode the PDCCH and identify the location of the PDSCH of the RAR from the PDCCH.

In one example, the number of PDCCH (for the RAR) repetitions can be predefined in a communication standard (e.g., 5G NR specification) governing the communication between the scheduling entity and the UE. In one example, the scheduling entity can transmit a RMSI that has a bitfield configured to indicate the number of control information repetitions for a specific beam or a subset of beams. In one example, the RMSI may have a bitfield that indicates a beam or a subset of beams to which the coverage enhancement technique is used or not used to repeat the PDCCH of message 2 or B. In one example, the RMSI may have a bitfield that indicates the particular coverage enhancement technique to be applied among a plurality of predefined or available coverage enhancement techniques, which may be predefined in a communication standard. For example, different values of the bitfield can indicate different numbers of repetition of the control information.

Beam-Specific Coverage Enhancement for RACH Using Beam Refinement

Figure 11:
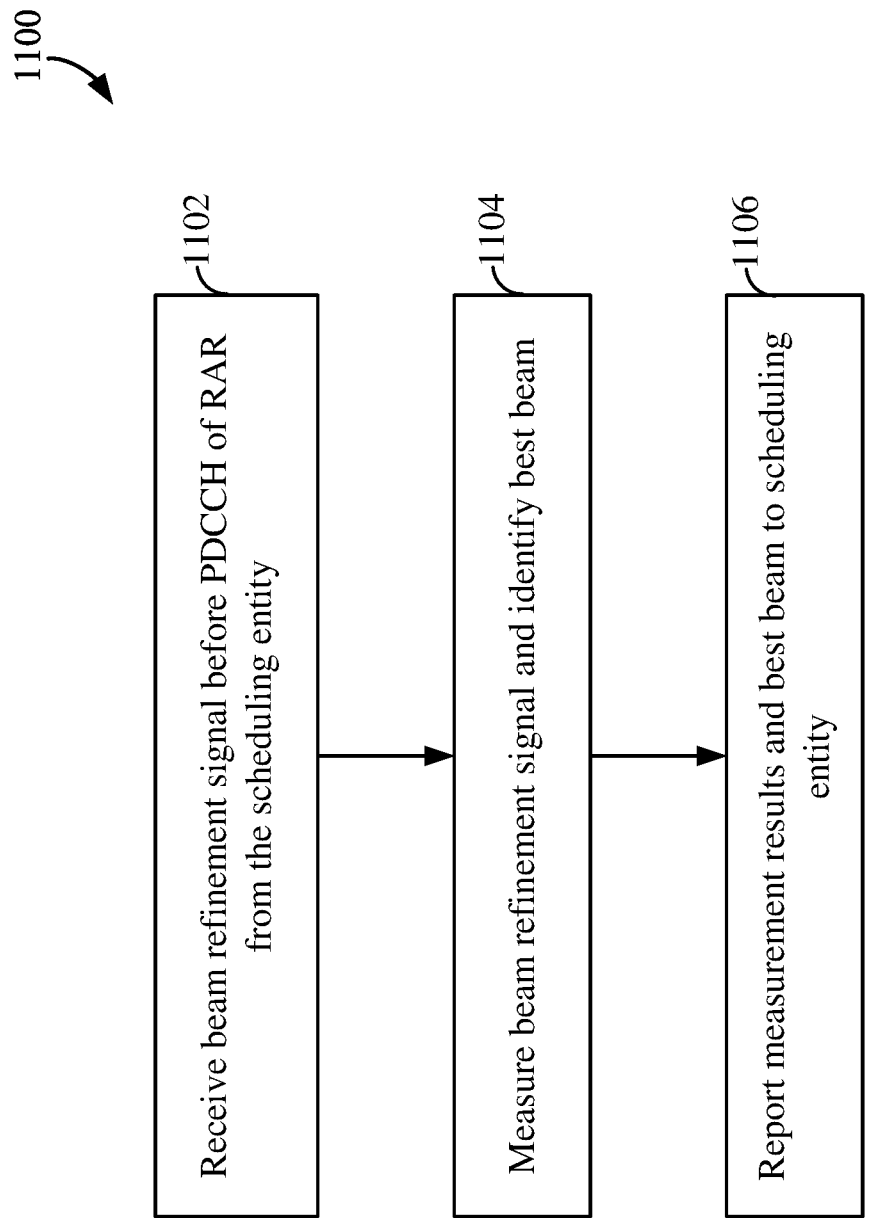
FIG. 11 is a flow chart illustrating a beam refinement procedure for RACH according to some aspects of the disclosure.

FIG. 11 is a flow chart illustrating a beam-specific coverage enhancement technique 1100 for RACH using beam refinement according to some aspects of the disclosure. In one example, the beam-specific coverage enhancement technique 1100 can be used in the random access procedure of FIG. 10 between the UE 1002 and the scheduling entity 1004. At block 1102, the UE 1002 can receive a beam refinement signal (e.g., beam refinement signal 1010 in FIG.

10) before receiving the PDCCH of RAR (e.g., message 2 or message B 1009 in FIG. 10). In one aspect, the resources and parameters of the beam refinement signal may be predefined in the communication standard (e.g., in relation to the resources for message 2 or B 1009) and/or configured by the system information 1005 (e.g., RMSI/SIB1) broadcasted by the scheduling entity 1004. The UE can use the beam refinement signal 1010 to refine the beam used for receiving the RAR. In some aspects, the UE may use the beam management procedures described above in relation to FIG. 5 to refine the beam. In one example, the beam refinement signal may include reference signals (e.g., CSI-RSs) transmitted on different beams. At block 1104, the UE can measure the reference signals (e.g., CSI-RSs) and identify the best beam based on the measurements. At block 1106, the UE may report the measurement results and/or best beam back to the scheduling entity, and the scheduling entity can use the best beam to transmit the RAR 1009 to the UE.

In some aspects, the above described beam-specific coverage enhancement techniques may be selectively applied, separately or together, depending on the frequency range, subcarrier spacing, and/or beams used for transmitting the RACH message.

Figure 12:
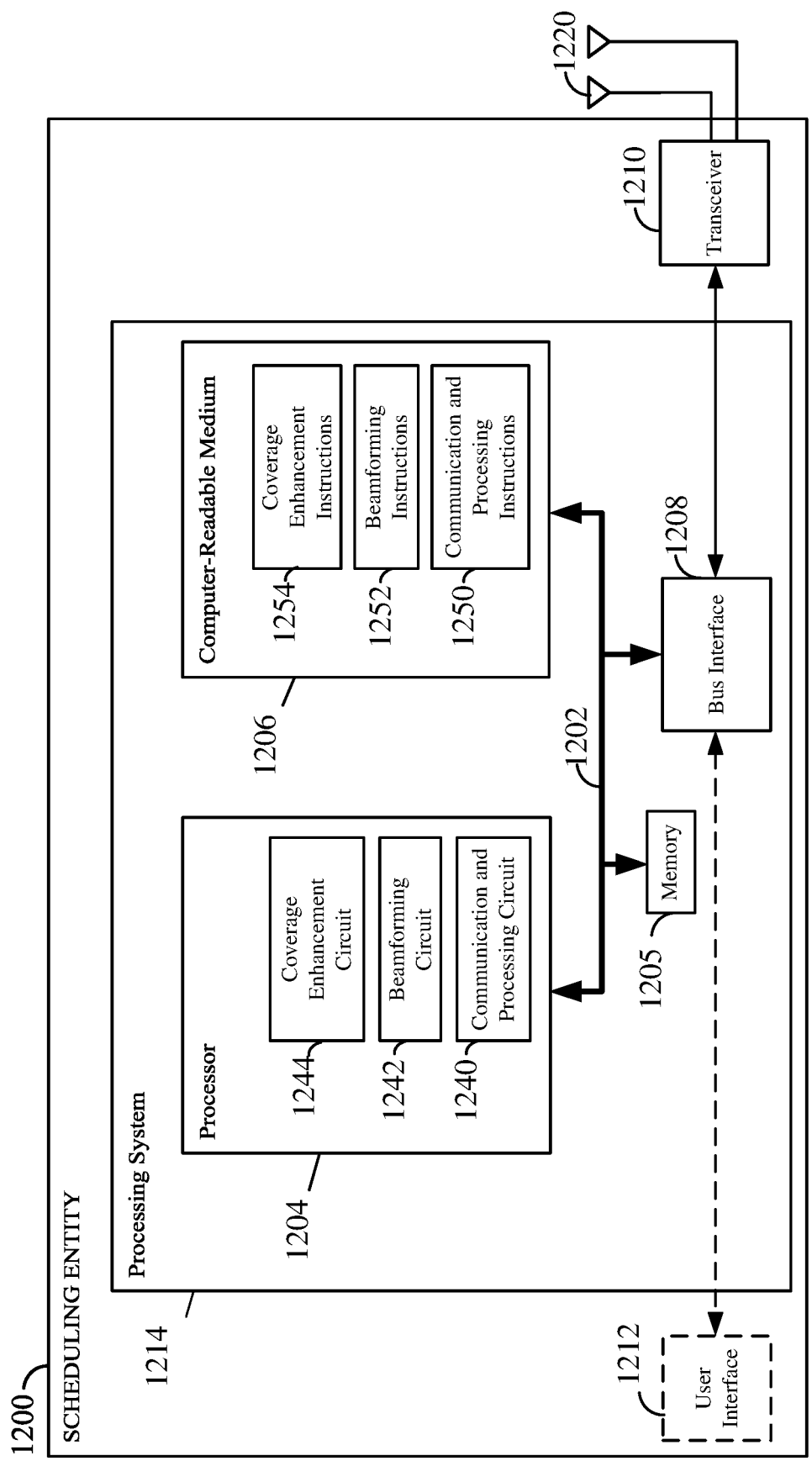
FIG. 12 is a block diagram illustrating an example of a hardware implementation for a scheduling entity according to some aspects of the disclosure.

FIG. 12 is a block diagram illustrating an example of a hardware implementation for a scheduling entity 1200 employing a processing system 1214. For example, the scheduling entity 1200 may be a base station or gNB as illustrated in any one or more of FIGS. 1, 2, 3, 5, 6, 7, 10, and/or 18.

The scheduling entity 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1200 may be configured to perform any one or more of the functions described herein. That is, the processor 1204, as utilized in a scheduling entity 1200, may be used to implement any one or more of the processes and procedures described and illustrated in FIGS. 10, 11, 13-15, 18, and 21.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 and antennas 1220 (e.g., antenna array) provide a communication interface or means for communicating with various other apparatus over a transmission medium. Depending upon the nature of the apparatus, a user interface 1212 (e.g., keypad, display, speaker, microphone, joystick) may also be provided. Of course, such a user interface 1212 is optional, and may be omitted in some examples, such as a base station.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions, including, for example, coverage enhancement techniques for a random access procedure. For example, the circuitry may be configured to implement one or more of the functions described in relation to FIGS. 5-10, 13-15, 18, and 21.

In some aspects of the disclosure, the processor 1204 may include communication and processing circuitry 1240 configured for various functions, including for example communicating with a network core (e.g., a 5G core network), scheduled entities (e.g., UE), or any other entity, such as, for example, local infrastructure or an entity communicating with the scheduling entity 1200 via the Internet, such as a network provider. In some examples, the communication and processing circuitry 1240 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1240 may include one or more transmit/receive chains. In addition, the communication and processing circuitry 1241 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1240 may further be configured to execute communication and processing software 1250 stored on the computer-readable medium 1206 to implement one or more functions described herein.

In some implementations where the communication involves receiving information, the communication and processing circuitry 1240 may obtain information from a component of the wireless communication device 1200 (e.g., from the transceiver 1210 that receives the information via radio frequency signaling or some other type of signaling suitable for the applicable communication medium), process (e.g., decode) the information, and output the processed information. For example, the communication and processing circuitry 1240 may output the information to another component of the processor 1204, to the memory 1205, or to the bus interface 1208. In some examples, the communication and processing circuitry 1240 may receive one or more of signals, messages, other information, or any combination thereof. In some examples, the communication and processing circuitry 1240 may receive information via one or more channels. In some examples, the communication and processing circuitry 1240 may include functionality for a means for receiving. In some examples, the communication and processing circuitry 1240 may include functionality for a means for processing, including a means for demodulating, a means for decoding, etc.

In some implementations where the communication involves sending (e.g., transmitting) information, the communication and processing circuitry 1240 may obtain information (e.g., from another component of the processor 1204, the memory 1205, or the bus interface 1208), process (e.g., modulate, encode, etc.) the information, and output the processed information. For example, the communication and processing circuitry 1240 may output the information to the transceiver 1210 (e.g., that transmits the information via radio frequency signaling or some other type of signaling suitable for the applicable communication medium). In some examples, the communication and processing circuitry 1240 may send one or more of signals, messages, other information, or any combination thereof. In some examples, the communication and processing circuitry 1240 may send information via one or more channels. In some examples, the communication and processing circuitry 1240 may include functionality for a means for sending (e.g., a means for transmitting). In some examples, the communication and processing circuitry 1240 may include functionality for a means for generating, including a means for modulating, a means for encoding, etc.

In some aspects, the communication and processing circuitry 1240 may further include random access message reception circuitry configured to receive Msg. 1 random access message information via transceiver 1210. In some examples, the random access message reception circuitry may be configured to communicate with other circuitry for generating the RAR (Msg. 2) to be transmitted to the UE.

In some aspects of the disclosure, the processor 1204 may include beamforming circuitry 1242 that can be configured to perform various beamforming related functions used in wireless communication. In some examples, the beamforming circuitry 1242 may include one or more hardware components that provide the physical structure that performs processes related to beamforming used in wireless communication. The beamforming circuitry 1242 can process signals transmitted to or received from the communication and processing circuitry 1240 using one or more beams via the transceiver 1210 and antennas 1220. The beamforming circuitry 1242 can select one or more transmit beams for uplink and downlink communication using a beam management procedure described above in relation to FIG. 5. The beamforming circuitry 1242 can also perform a beam refinement procedure described above in relation to FIG. 5. In some aspects, the beamforming circuitry 1242 can process periodic SSBs for transmission using a beam sweep. The beamforming circuitry 1242 can process CSI-RS for transmission on one or more beams to facilitate beam measurements. The beamforming circuitry 1242 may further be configured to execute beamforming software 1252 stored on the computer-readable medium 1206 to implement one or more functions described herein.

In some aspects of the disclosure, the processor 1204 may include coverage enhancement circuitry 1244 that can be configured to perform various functions to provide coverage enhancement to various signals or channels, for example, signals information or channels used in a random access procedure. In some examples, the coverage enhancement circuitry 1244 may include one or more hardware components that provide the physical structure that performs processes related to coverage enhancement described herein. In some examples, the coverage enhancement circuitry 1244 can provide beam-specific coverage enhancement for the control information of a random access message (e.g., PDCCH in message 2 or message B of a RACH procedure). In one example, the coverage enhancement circuitry 1244 can repeat the PDCCH in message 2 or message B during a RAR window for a specific beam or a subset of beams. Repetition of the PDCCH message can increase its coverage. A greater coverage allows the PDCCH to be received and decoded at a greater distance from the scheduling entity. In some examples, the coverage enhancement circuitry 1244 can transmit system information (e.g., RMSI) to a UE to indicate the beam or subset of beams on which coverage enhancement is used to transmit the RACH control information (e.g., PDCCH). The coverage enhancement circuitry 1244 may further be configured to execute coverage enhancement software 1254 stored on the computer-readable medium 1206 to implement one or more functions described herein.

In some aspects, the coverage enhancement circuitry 1244 may include RMSI determination circuitry, configured to communicate information to UEs concerning, among other things, beam-specific information regarding the application of enhanced random access message process. Additionally, the RMSI determination circuitry may be configured to determine and insert an extra bit field in the RMSI to communication the various parameters discussed herein including the enhanced random access message indication for each beam or beam set, as well as the RSRP threshold as also discussed above.

Figure 13:
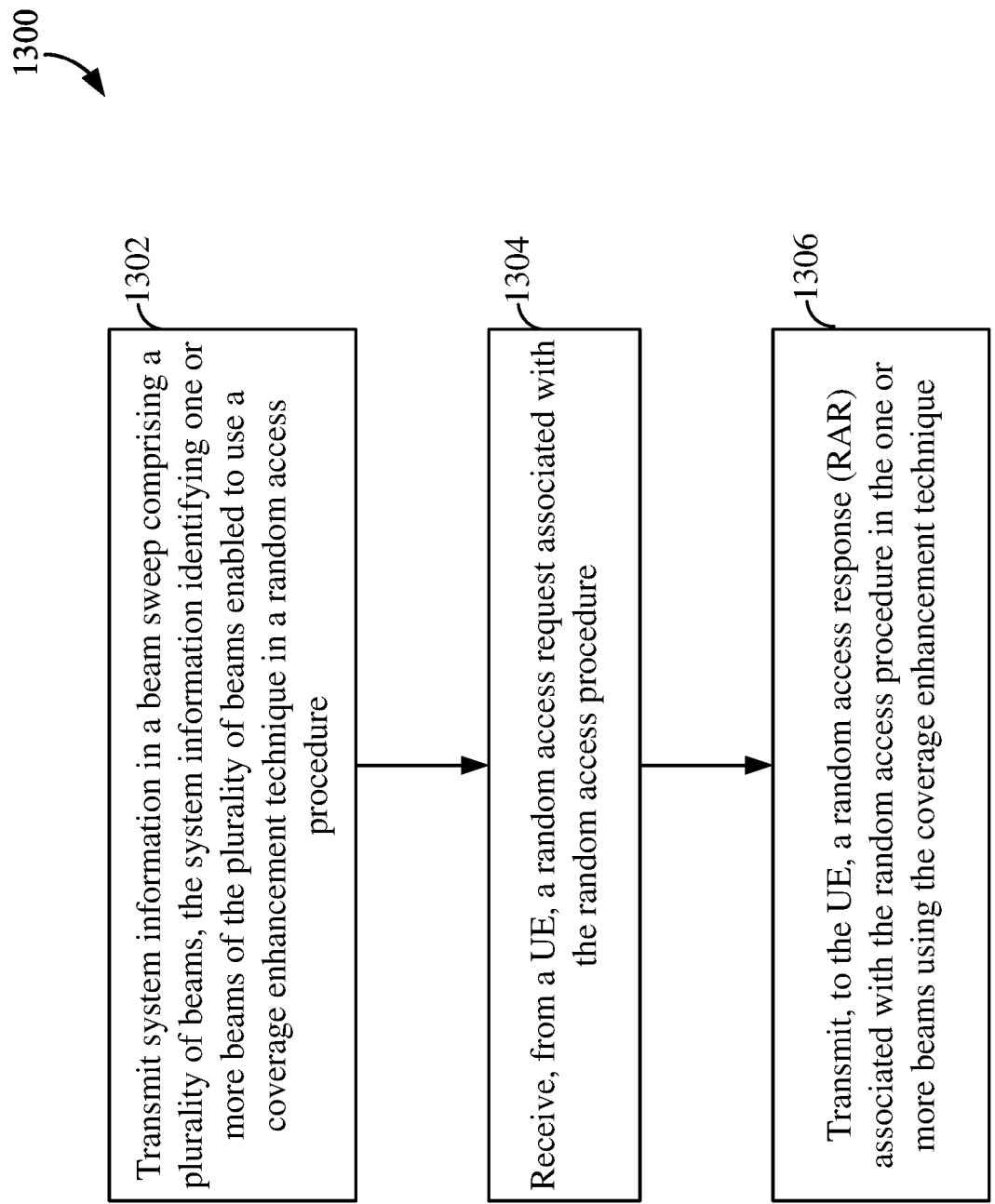
FIG. 13 is a flow chart illustrating an exemplary process for providing beam-specific coverage enhancement in a random access procedure according to some aspects of the disclosure.

FIG. 13 is a flow chart illustrating an exemplary process 1300 for providing beam-specific coverage enhancement in a random access procedure according to some aspects of the disclosure. As described below, some or all illustrated features may be omitted in a particular implementation within the scope of the present disclosure, and some illustrated features may not be required for implementation of all implementations. In some examples, the process 1300 may be carried out by the scheduling entity 1200 illustrated in FIG. 12. In some examples, the process 1300 may be carried out by any suitable apparatus or means for carrying out the functions or algorithm described below.

At block 1302, a scheduling entity (e.g., a gNB or base station) can transmit system information in a beam sweep including a plurality of beams. The system information identifies one or more beams of the plurality of beams enabled to use a coverage enhancement technique in a random access procedure. In one example, the scheduling entity can transmit the system information in remaining minimum system information (RMSI) or SIB1. In one example, RMSI may include a bitfield (e.g., one or more bits) that indicates the index (e.g., SSB or beam index) of an SSB beam or a subset of SSB beams on which the scheduling entity can transmit control information of a RACH message (PDCCH of message 2 or B) using a coverage enhancement technique. The coverage enhancement technique can allow the control information to be received by a UE at a further distance from the scheduling entity. In one example, the coverage enhancement circuitry 1244 may provide a means for determining the system information (e.g., RMSI) for enabling the coverage enhancement technique on a specific beam or a subset of beams. The communication and processing circuitry 1240 and the beamforming circuitry 1242 may provide a means for transmitting the system information (e.g., RMSI) in a beam sweep via the transceiver 1210 and antennas 1220.

At block 1304, the scheduling entity can receive a random access request associated with the random access procedure from a UE. In one example, the random access request (e.g., RACH message 1 or message A) may include a PRACH preamble for a RACH procedure. In one example, the communication and processing circuitry 1240 may provide a means for receiving the random access request 1007 from the UE in one or more beams (e.g., SSB beams) according to the system information. For example, the RMSI may identify one or more beams for receiving the random access request using the coverage enhancement technique.

At block 1306, the scheduling entity can transmit a random access response (RAR) associated with the random access procedure in one or more beams using the coverage enhancement technique. In some aspects, the random access request and/or the RAR can be configured according to the coverage enhancement technique corresponding to the one or more beams. For example, the scheduling entity can transmit the control information of the RAR (e.g., PDCCH for message 2 or B) in one or more beams that are identified in the RMSI (e.g., SIB1) using the coverage enhancement technique. The scheduling entity may not use the coverage enhancement technique when the control information is transmitted on a beam not identified by the RMSI to use the coverage enhancement technique. In one example, the control information may be the PDCCH of a RAR (e.g., message 2 or message B). In one aspect, the communication and processing circuitry 1240 and transceiver 1210 may provide a means for transmitting the control information using a beam determined by the beamforming circuitry 1242. The coverage enhancement circuitry 1244 may provide a means for processing the control information according to the coverage enhancement technique (e.g., signal repetition). In one example, the coverage enhancement technique may repeat the control information on one or more beams according to the control information (e.g., RMSI). The scheduling entity may transmit the same repeated version of the control information or different redundancy versions of the control information. The UE can identify and combine (e.g., using soft combining) multiple instances of the control information (e.g., PDCCH of message 2 or message B) to improve the likelihood that the UE can successfully decode the PDCCH and identify the location of the PDSCH of the RAR.

In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1-3, 5-7, 10, and 18, and utilizing, for example, the processes and/or algorithms described herein in relation to FIGS. 8-11, 13, 18, and 21.

Exemplary Coverage Enhancement Techniques

An exemplary coverage enhancement technique uses signal repetition to improve the effective range of a signal or channel (e.g., PDCCH). In one example, the scheduling entity (e.g., scheduling entity 1004) can transmit multiple instances or copies of the control information of a RACH message (e.g., message 2 or B in PDCCH) to increase the likelihood that a UE (e.g., UE 1002) can successfully receive the control information (e.g., message 2 or B) in a random access procedure. In one example, the number of PDCCH repetitions can be predefined in a communication standard (e.g., 5G NR specification) governing the communication between the scheduling entity and the UE. In one example, the scheduling entity can transmit a RMSI (e.g., SIB1 1005) that has a bitfield configured to indicate the number of PDCCH repetitions for a specific beam or a subset of beams. In one example, the RMSI may have a bitfield that indicates a beam or a subset of beams to which the coverage enhancement technique is used. In one example, the RMSI may have a bitfield that indicates the particular coverage enhancement technique to be applied among a plurality of predefined or available coverage enhancement techniques, which may be defined in a communication standard. For example, the predefined coverage enhancement techniques may include various PDCCH repetition and beam refinement methods.

Figure 14:
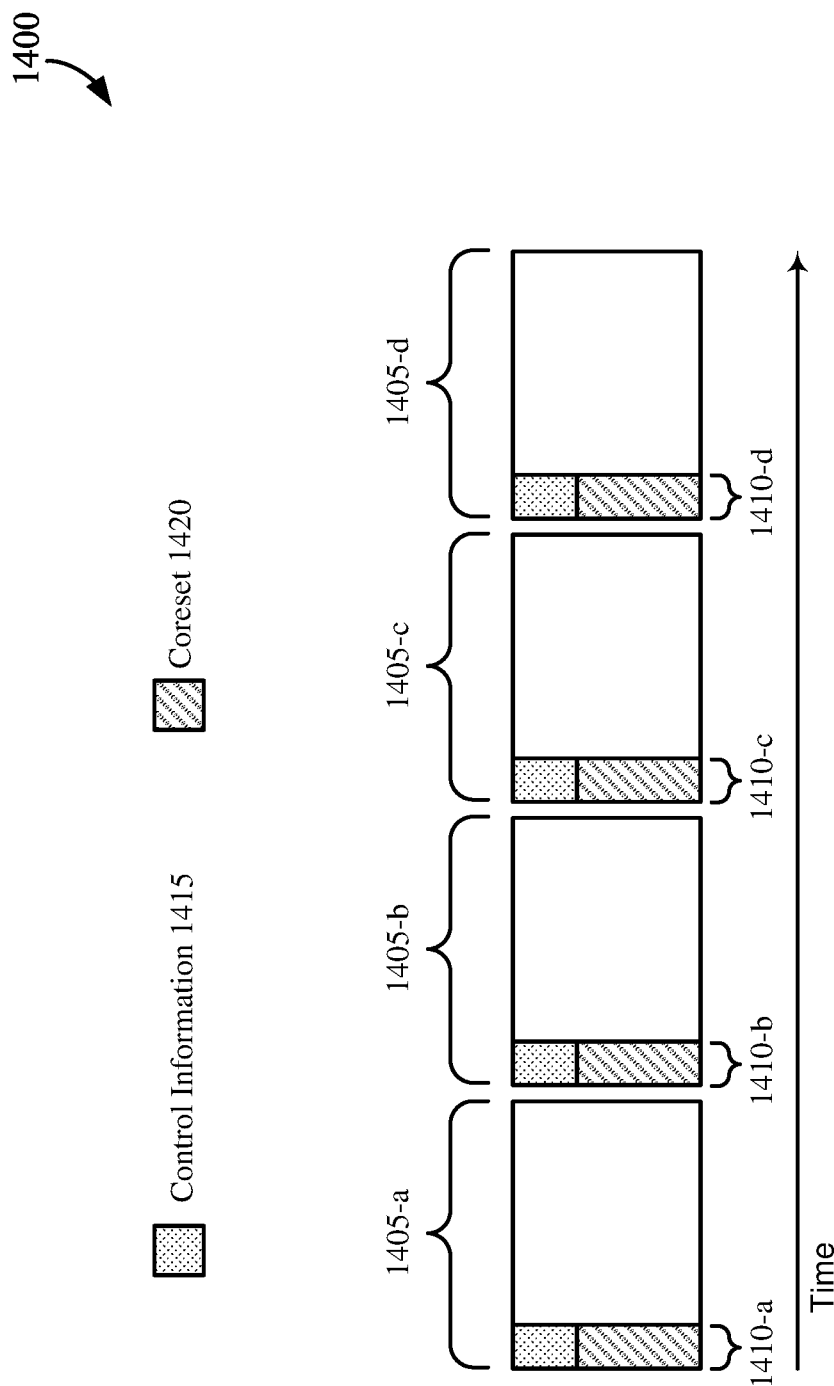
FIG. 14 is a diagram illustrating an exemplary repetition schedule of control information in a random access procedure according to some aspects of the disclosure.

FIG. 14 illustrates an example of a repetition schedule 1400 that supports control information repetition for a random access procedure in accordance with aspects of the present disclosure. In some examples, the repetition schedule 1400 illustrates how a scheduling entity may transmit multiple instances of the control information of a RACH message (e.g., PDCCH message 2 or message B) associated with a RAR in a number of consecutive slots for a specific beam or a subset of beams. When a scheduling entity transmits control information according to the repetition schedule 1400, a UE is more likely to receive the control information and connect to the scheduling entity using a random access procedure during a low connectivity condition.

The repetition schedule 1400 may include a number of slots, for example, slot 1405-a, slot 1405-b, slot 1405-c, and slot 1405-d. In other examples, the repetition schedule may use more or fewer slots. Each slot may include PDCCH resources (e.g., a CORESET 1420), and each CORESET 1420 can include an instance of the control information 1415 of a RAR (e.g., PDCCH of message 2 or B). In some examples, each instance of the control information 1415 may be in the same location (e.g., time and/or symbol) in each of the slots. For example, the scheduling entity may transmit multiple instances of control information 1415 associated with the same RAR such that the UE may receive one or more instances of the control information 1415 at monitoring occasions 1410-*a*, 1410-*b*, 1410-*c*, and/or 1410-*d*. The UE can receive the control information 1414 at the same location or symbol in each consecutive slot. In some examples, each instance of the control information 1415 may contain the same information (e.g., same redundancy version), and the UE may combine (e.g., soft combining) two or more instances of the control information 1415 to increase the likelihood of decoding the control information. In another example, each instance of the control information 1415 may contain different information (e.g., different redundancy versions). In some cases, one or more instances of the control information 1415 may be in different locations (e.g., different symbols) in one or more slots 1405.

Figure 15:
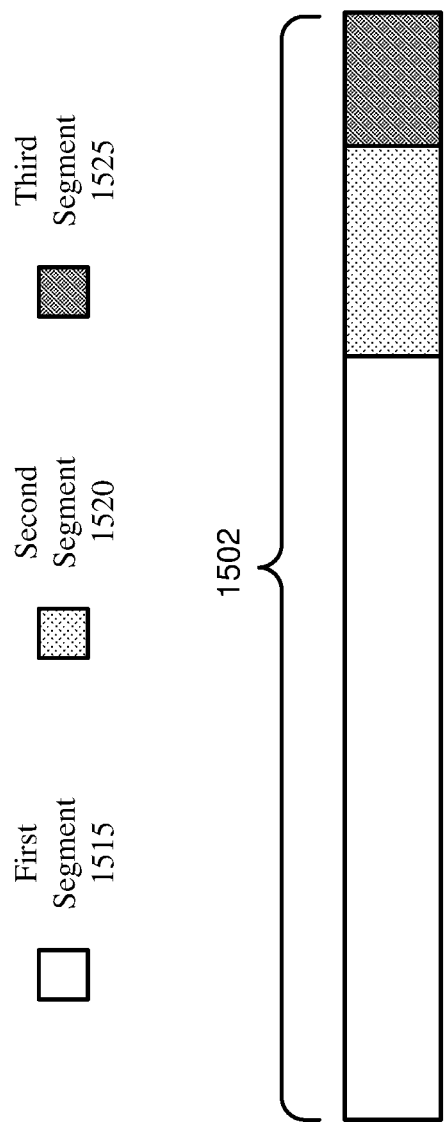
FIG. 15 is a diagram illustrating an exemplary multi-segment random access response (RAR) window according to some aspects of the disclosure.

In some aspects of the disclosure, the scheduling entity may use a multi-segment RAR window to transmit multiple instances of the control information 1415. Referring to FIG. 15, an exemplary multi-segment RAR window 1502 may have two or more segments, for example, a first segment 1515, a second segment 1520, and a third segment 1525. The different segments may have the same number of slots or different number of slots. In one example, the scheduling entity can transmit system information (e.g., RMSI) that includes the parameters (e.g., slot sizes and use of coverage enhancement) of the multi-segment RAR window. For example, the RMSI may indicate the monitoring procedures for monitoring and receiving the PDCCH message 2/B in different segments of the RAR window 1502. In one example, the scheduling entity may use a coverage enhancement technique (e.g., signal repetition) in only a subset of the window segments to transmit the PDCCH message 2/B. For example, during the first segment 1515, the UE may identify and combine (e.g., using soft combining) multiple instances of the RAR control information (e.g., PDCCH message 2/B) to improve the likelihood that the UE can successfully decode the control information and identify the location of the RAR. In other examples, the scheduling entity can use other coverage enhancement techniques in one or more segments of the RAR window 1502.

Figure 16:
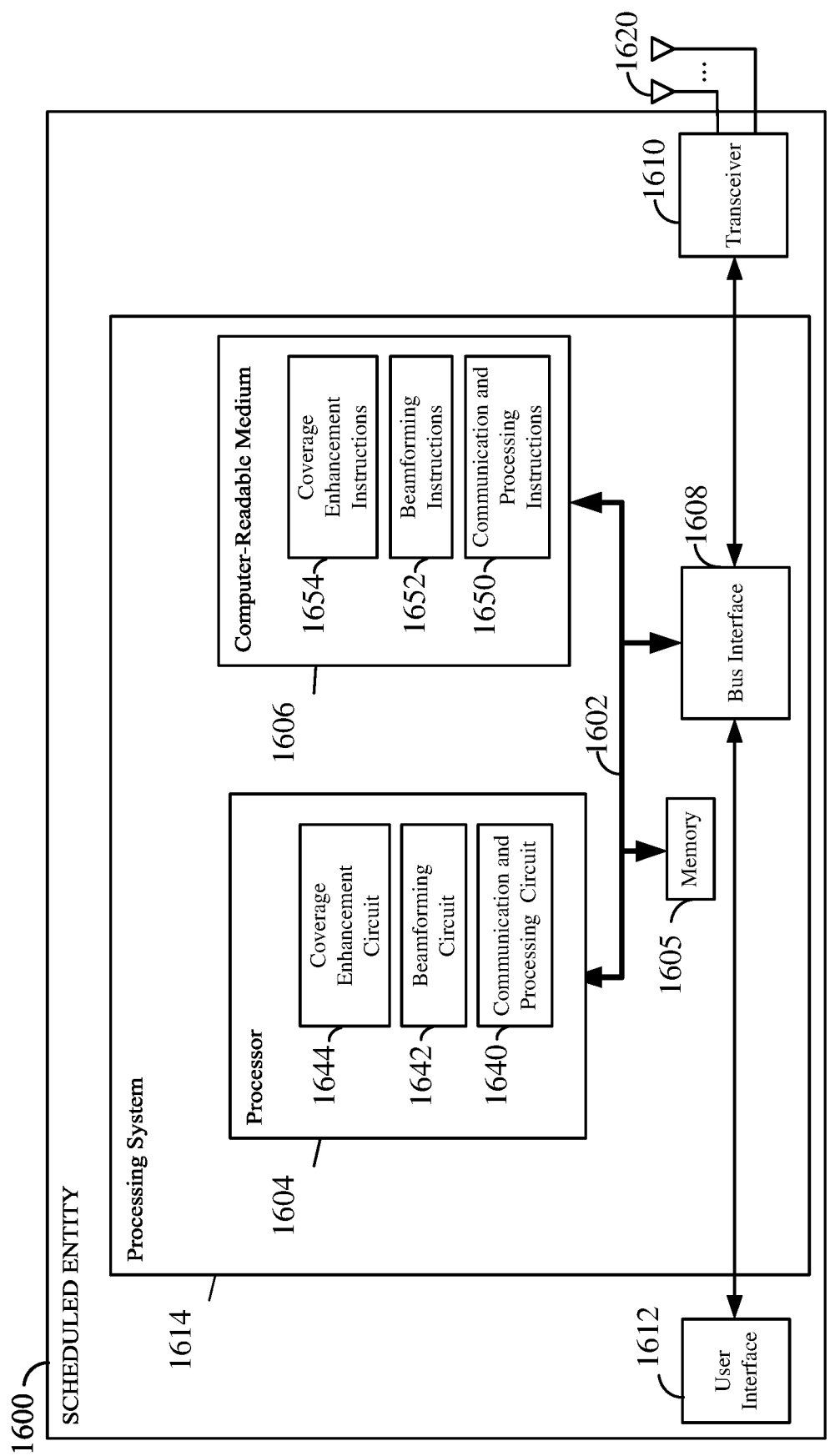
FIG. 16 is a block diagram illustrating an example of a hardware implementation for a scheduled entity according to some aspects of the disclosure.

FIG. 16 is a conceptual diagram illustrating an example of a hardware implementation for an exemplary scheduled entity 1600 employing a processing system 1614. In accordance with various aspects of the disclosure, an element, or any portion of an element, or any combination of elements may be implemented with a processing system 1614 that includes one or more processors 1604. For example, the scheduled entity 1600 may be a user equipment (UE) as illustrated in any one or more of FIGS. 1, 2, 3, 5-7, 10, and/or 18.

The processing system 1614 may be substantially the same as the processing system 1214 illustrated in FIG. 12, including a bus interface 1608, a bus 1602, memory 1605, a processor 1604, and a computer-readable medium 1606. Furthermore, the scheduled entity 1600 may include a user interface 1612, a transceiver 1610, and antennas 1611 substantially similar to those described above in FIG. 12. That is, the processor 1604, as utilized in a scheduled entity 1600, may be used to implement any one or more of the processes described and illustrated in relation to FIGS. 5-11, 14, 15, and 17-20.

In some aspects of the disclosure, the processor 1604 may include communication and processing circuitry 1640 configured for various functions, including for example communicating with a scheduling entity (e.g., gNB or base station) or any other entity (e.g., UE). In some examples, the communication and processing circuitry 1640 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1640 may include one or more transmit/receive chains. In addition, the communication and processing circuitry 1640 may be configured to process and transmit uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1640 may further be configured to execute communication and processing software 1650 stored on the computer-readable medium 1606 to implement one or more functions described herein.

In some implementations where the communication involves receiving information, the communication and processing circuitry 1640 may obtain information from a component of the wireless communication device 1600 (e.g., from the transceiver 1610 that receives the information via radio frequency signaling or some other type of signaling suitable for the applicable communication medium), process (e.g., decode) the information, and output the processed information. For example, the communication and processing circuitry 1640 may output the information to another component of the processor 1604, to the memory 1605, or to the bus interface 1608. In some examples, the communication and processing circuitry 1640 may receive one or more of signals, messages, other information, or any combination thereof. In some examples, the communication and processing circuitry 1640 may receive information via one or more channels. In some examples, the communication and processing circuitry 1640 may include functionality for a means for receiving. In some examples, the communication and processing circuitry 1640 may include functionality for a means for processing, including a means for demodulating, a means for decoding, etc.

In some implementations where the communication involves sending (e.g., transmitting) information, the communication and processing circuitry 1640 may obtain information (e.g., from another component of the processor 1604, the memory 1605, or the bus interface 1608), process (e.g., modulate, encode, etc.) the information, and output the processed information. For example, the communication and processing circuitry 1640 may output the information to the transceiver 1610 (e.g., that transmits the information via radio frequency signaling or some other type of signaling suitable for the applicable communication medium). In some examples, the communication and processing circuitry 1640 may send one or more of signals, messages, other information, or any combination thereof. In some examples, the communication and processing circuitry 1640 may send information via one or more channels. In some examples, the communication and processing circuitry 1640 may include functionality for a means for sending (e.g., a means for transmitting). In some examples, the communication and processing circuitry 1640 may include functionality for a means for generating, including a means for modulating, a means for encoding, etc.

In some aspects of the disclosure, the processor 1604 may include beamforming circuitry 1642 that can be configured to perform various functions used in beamforming for wireless communication. In some examples, the beamforming circuitry 1642 may include one or more hardware components that provide the physical structure that performs processes related to beamforming for wireless communication. The beamforming circuitry 1642 can process signals transmitted to or received from the communication and processing circuitry 1640 using one or more beams via the transceiver 1610 and antennas 1620. The beamforming circuitry 1642 can select one or more receive beams for uplink and/or downlink communication using a beam management procedure described above in relation to FIG. 5. The beamforming circuitry 1642 can also perform a beam refinement procedure described above in relation to FIG. 5. In some aspects, the beamforming circuitry 1642 can process periodic SSBs received in a beam sweep via the transceiver 1610 and antennas 1620. For example, the beamforming circuitry 1642 can process the CSI-RS received on one or more beams and perform beam measurements based on the CSI-RS. The beamforming circuitry 1642 may further be configured to execute beamforming software 1652 stored on the computer-readable medium 1606 to implement one or more functions described herein.

In some aspects of the disclosure, the processor 1604 may include coverage enhancement circuitry 1644 that can be configured to perform various functions to provide coverage enhancement for broadcast channels used in a random access procedure. In some examples, the coverage enhancement circuitry 1644 may include one or more hardware components that provide the physical structure that performs processes related to coverage enhancement described herein. In some examples, the coverage enhancement circuitry 1644 can provide beam-specific coverage enhancement for the control information of a random access message (e.g., PDCCH in message 2 or message B of a RACH procedure). In one example, the coverage enhancement circuitry 1644 can process and combine repeated control information (e.g., PDCCH message 2 or message B) during a RAR window for a specific beam or a subset of beams. In some examples, the coverage enhancement circuitry 1644 can process system information (e.g., RMSI/SIB1) to determine the beam or subset of beams on which coverage enhancement is used to receive the RACH control information (e.g., PDCCH message 2 or B).

The coverage enhancement circuit may include system information (SI)/remaining minimum system information (RMSI) decoding circuitry, configured to perform various functions for receiving and decoding information including PRACH enhancement information. In aspects, the SI/RMSI decoding circuitry may be configured to monitor and decode the bit field in the RMSI for each SSB beam as discussed herein (e.g., beam specific information such as a beam index information or beam set index information) that is used to determine application of the random access message enhancement (e.g., PRACH repetition or format modification). The information in the bit field to be decoded by the SI/RMSI decoding circuitry may also include an SSB-based RSPR threshold used for further determining of whether to apply random access message repetition, for example.

The coverage enhancement circuitry may further include enhanced random access message determination circuitry, configured to determine to apply enhanced random access message processes, such as the enhance random access message processes described in connection with FIGS. 18-20. In some examples, enhanced random access message determination circuitry may be in communication with SI/RMSI decoding circuitry to receive information concerning beam-specific application for random access messages or other parameters such as the SSB-based RSPR threshold. Based on the parameters and information from decoding circuitry, the enhanced random access message determination circuitry may be configured to determine for each SSB beam index or set of beam index if the RMSI information indicates enhanced random access message operations, and to implement transmission of the random access message (e.g., PRACH preamble) in conjunction with transceiver 1610, for example.

The coverage enhancement circuitry 1644 may further be configured to execute coverage enhancement software 1654 stored on the computer-readable medium 1606 to implement one or more functions described herein.

Figure 17:
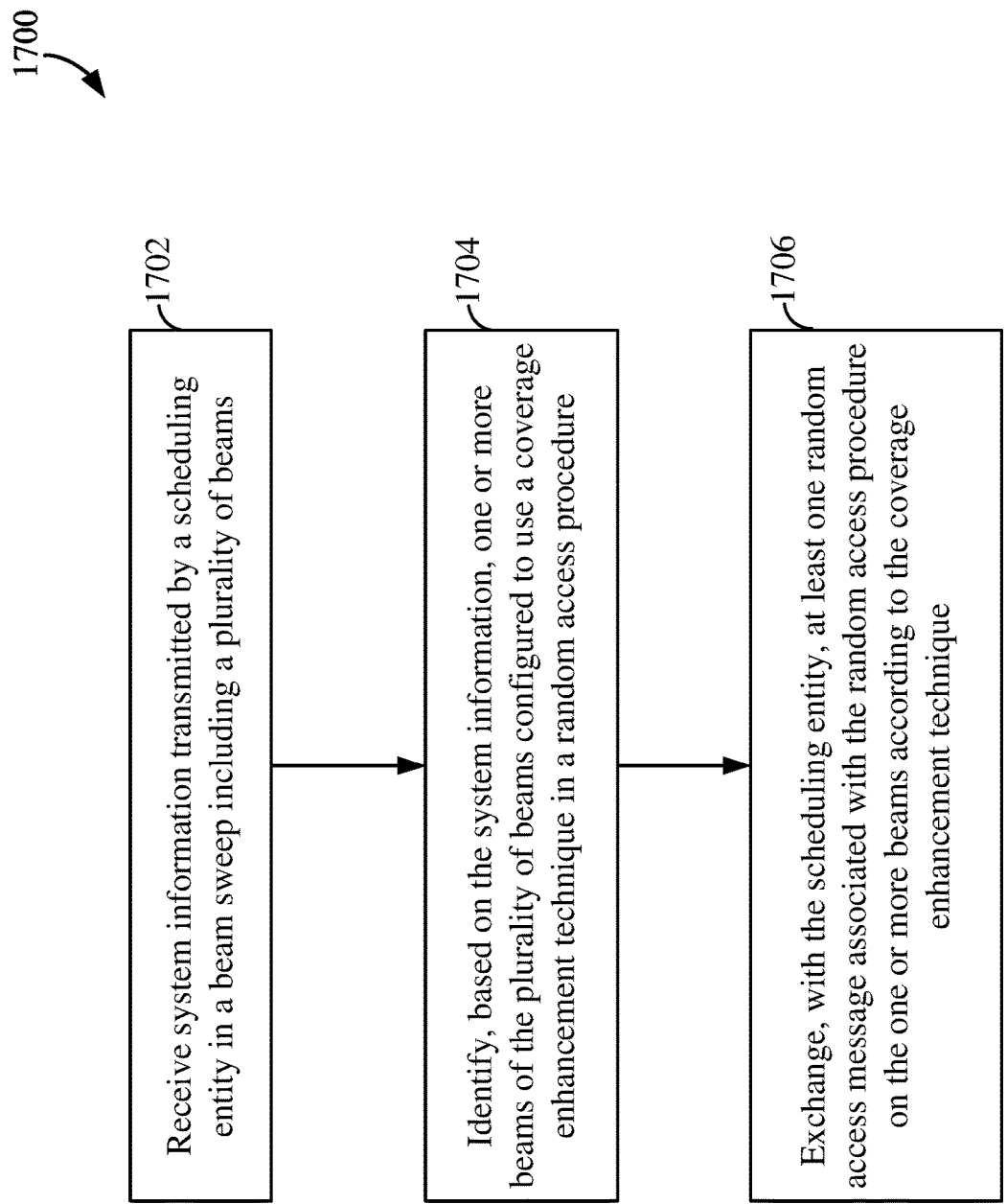
FIG. 17 is a flow chart illustrating an exemplary process for providing beam-specific coverage enhancement in a random access procedure according to some aspects of the disclosure.

FIG. 17 is a flow chart illustrating an exemplary process 1700 for providing beam-specific coverage enhancement in a random access procedure in accordance with some aspects of the present disclosure. As described below, some or all illustrated features may be omitted in a particular implementation within the scope of the present disclosure, and some illustrated features may not be required for implementation of all implementations. In some examples, the process 1700 may be carried out by the scheduled entity 1600 illustrated in FIG. 16. In some examples, the process 1700 may be carried out by any suitable apparatus or means for carrying out the functions or algorithm described below.

At block 1702, a UE (e.g., scheduled entity) can receive system information broadcasted or transmitted by a scheduling entity (e.g., gNB or base station) in a beam sweep including a plurality of beams. In one example, the system information may be RMSI (e.g., SIB1 in a PDSCH) broadcasted by the scheduling entity. In one example, the communication and processing circuitry 1640 may provide a means for receiving the system information in a plurality of beams via the transceiver 1610 and antennas 1620. The beamforming circuitry 1642 can provide a means to determine and select the beams (e.g., one or more transmit and receive beams) for wireless communication with the scheduling entity.

At block 1704, the UE can identify, based on the system information, one or more beams of the plurality of beams enabled to use a coverage enhancement technique in a random access procedure. In one example, the RMSI can include a bitfield (e.g., one or more bits) that indicates the index (e.g., SSB or beam index) of an SSB beam or a subset of SSB beams on which the UE can apply a coverage enhancement technique to receive the control information (e.g., message 2 or B) of a RAR (e.g., RAR 1008). In one example, the coverage enhancement circuitry 1644 may provide a means for identifying the one or more beams enabled or not enabled to use the coverage enhancement technique in a RACH procedure. In one example, the coverage enhancement technique may apply signal repetition to the control information of a RAR (e.g., PDCCH of message 2 or message B) as described above in relation to FIGS. 14 and 15. In other aspects, the RMSI may indicate other coverage enhancement techniques.

At block 1706, the UE exchange (transmit or receive), with the scheduling entity, at least one random access message associated with the random access procedure on the one or more beams according to the coverage enhancement technique. In one example, the at least one random access message may include a random access request that can be repeated on the one or more beams according to the coverage enhancement technique. An example of repeating the random access request will be described in more detail below in relation to FIGS. 18-19. In one example, the at least one random access message may include a RAR. The RAR includes control information (e.g., PDCCH message 2 or B) repeated for a predetermined number of times on the one or more beams according to the coverage enhancement technique. In one example, the control information may be the PDCCH (message 2/B) of a random access procedure for accessing a network. In one example, the UE can receive multiple instances of the control information for the RAR. The multiple instances of control information may include the same repeated version and/or different versions of the control information. The communication and processing circuitry 1640 may provide a means for receiving the control information via the transceiver 1610 and antennas 1620. The communication and processing circuitry 1640 may also provide a means to combine (e.g., soft combining) the repeated control information.

In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1-3, 5-7, 10, and 18, and utilizing, for example, the processes and/or algorithms described herein in relation to FIGS. 8-11 and 17-20.

Figure 18:
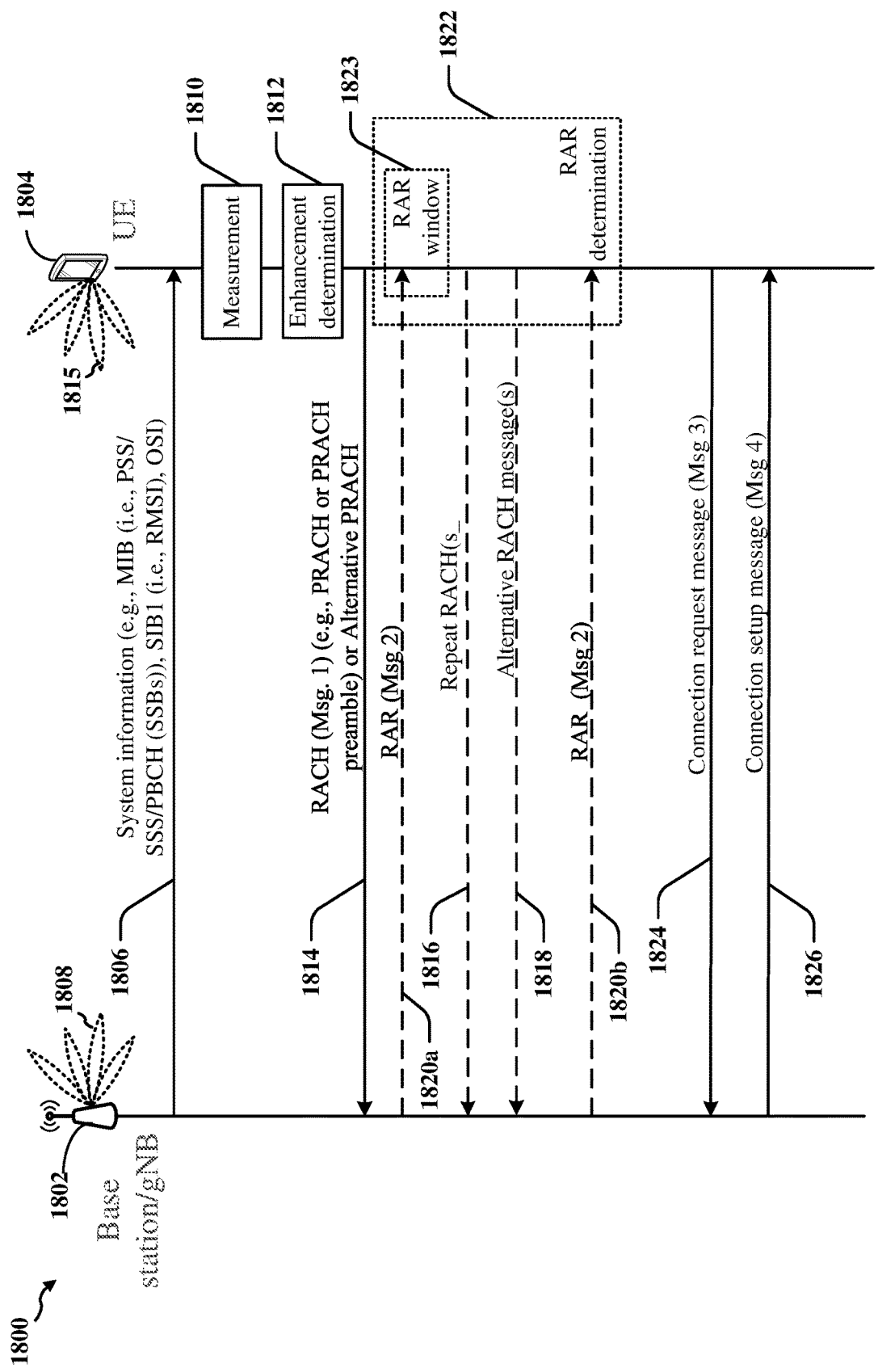
FIG. 18 is a call flow diagram illustrating an example of initial access and RACH processes according to some aspects of the disclosure.

FIG. 18 illustrates a call flow diagram 1800 of processes for providing enhanced or modified RACH procedures in a wireless system. The RACH procedures in call flow diagram 1800 provide enhanced or modified RACH operations that account for particular SSB beams or subsets of SSB beams and thus are beam-specific or beam subset specific operations. In the example of FIG. 18, the wireless communications system may include a base station or gNB 1802 and a UE 1804. The base station 1802, for example, may be implemented as a base station or scheduling entity in any of FIGS. 1-3, 5-7, 10, and 12. The UE 1804, for example, may be implemented as a UE or scheduled entity in any of FIGS. 1-3, 5-7, 10, and 12.

The base station 1802 may provide a cell (e.g., cell 720 of FIG. 7) or coverage area, which the UE 1804 may enter. In the cell, the base station 1802 may transmit (e.g., broadcast), and the UE 1804 may receive, system information 1806. In some aspects, system information 1806 may include one or more SIBs, such as a SIB1. For example, system information 1806 may include RMSI in the SIB1. According to some examples, system information 1806 may include information associated with cell access, such as initial access parameters, and/or other information associated with establishing a connection and communicating with the base station 1802. In some aspects, system information 1806 may include initial access and RACH information or parameters. In some aspects, the system information 1806 is broadcast using beam sweeping as discussed before, which is shown representationally by a group of beams 1808. Moreover, RMSI in the system information 1806 may include information communicated to the UE 1804 concerning which beams or subsets of beams (e.g., a set of beams) the UE 1804 should apply the enhanced or modified RACH processes, which may be referred to herein as "physical random access channel (PRACH) enhancement information" or, more generally, random access enhancement information. For example, the random access enhancement information may indicate the set of beams to which enhanced or modified random access transmission procedures may be applied, as described in more detail below.

After receiving the system information 1806, which may include a number of SSBs, the UE 1804 may determine (e.g., measure) measurement information 1810, which may include one or more values indicative of a respective quality and/or power associated with each of the beams in the set of beams 1808 via which the SSBs are respectively transmitted. For example, the UE 1804 may determine (e.g., measure), a RSRP, a reference signal receive quality (RSRQ), a signal-to-noise ratio (SNR), and/or a reference signal strength indicator (RSSI) respectively corresponding to each of the SSBs received by the UE 1804.

In further aspects, the flow may include a PRACH enhancement determination process 1812 based on information received in the system information 1806 (e.g., random access enhancement information). In this case, the system information 1806 from the base station 1802 includes PRACH enhancement information related to one or more beams used by the base station (e.g., a particular beam (SSB index) or a subset of beams (a subset index indicated a set of SSBs)). In an example, PRACH enhancement information may be received within RMSI. In such case, the RMSI may include a bit field (e.g., bit field 968 in FIG. 9B) that indicates beams or beam subsets to which the PRACH enhancement or modification procedures should be applied. Of further note, the bit field in the RMSI may include the beam index or an index corresponding to the SSB beam subset. Additionally, the bit field may be beam-specific where the bit field is associated with a beam or a subset of beams and may indicate the enhancement process for the PRACH among a set of predefined options (e.g., options defined in a standard specification such as 5G NR). In yet further aspects, the beam-specific bit field in RMSI may be configured to indicate the number of PRACH repetitions for a corresponding SSB beam or subset of SSB beams. For example, in the example of FIG. 19, which will be discussed below, the four PRACH preamble repetitions shown may be specified in the bit field.

In yet further examples, the PRACH repetition for a corresponding beam may be also be conditioned by or contingent upon the values of other parameters such as a threshold SSB-based RSRP, which can be predefined or configured by the beam-specific bit field in RMSI. Still further, the beam-specific bit field in RMSI may be configured to indicate a subset of preamble sequences that may be associated with PRACH repetition. Additionally, the enhanced PRACH processes may be applicable depending on the frequency range, subcarrier spacing, and/or the number of SSB beams.

After the measurement and determination processes 1810, 1812, the UE 1804 transmits a random access message 1814 (also known in the art as message 1 or Msg 1), which may include a PRACH preamble on a configured RACH resource (termed hereinafter as simple "PRACH"). The random access message 1814 is used to signal to the base station 1802 that the UE is attempting initial access to the network. In an aspect, the UE 1804 may utilize a same beam based on the measurement 1810, for example, which is shown represented at 1815. In the case where the random access enhancement information indicates that the random access message enhancement or modification should be applied to the particular beam (or subset of beams) as determined at block 1812, the enhancement processes may include repeated random access message transmissions and/or the use of a modified or alternative random access message. These options are respectively illustrated by repeat random access message(s) 1816, which may be one or more repeated transmissions of the random access message, or the alternative random access message preamble message 1818. In other examples, the alternative or modified random access message 1818 may be repeated as well. Additionally, it is noted that in other aspects a conventionally formatted random access message may be transmitted at 1814 and then for a repeat transmission, an alternative random access message may be utilized as shown at 1818.

In response to the random access message 1814, the base station 1802 will respond with a random access response (RAR) message 1820 (e.g., RAR 1820a for immediately in time after message 1814 or RAR 1820b if the RAR is not received immediately and is received after repeated random access message transmission(s)), which is also known as Message 2 or Msg 2. The RAR message 1820 is transmitted using the PDCCH and PDSCH channels. It is noted that when the enhanced random access message processes are employed for a particular beam or beam subset, the RAR message 1820 may be received by the UE before a repeated random access message is transmitted (e.g., 1816). Thus, the UE 1804 may employ a RAR determination process as shown at 1822 (which may include a RAR window 1823 in which the UE monitors for the RAR message 1820 for some predetermined time after which the random access message (Msg 1) could be repeated and transmitted in accordance with other examples disclosed herein), which would commence after transmitting Msg1 1814 and would complete whenever the RAR message 1820 is received, whether that be after the first transmission or after any of the subsequent repeat random access message (Msg. 1) transmissions in the case of the enhance random access message process including repeat random access message transmissions.

Figure 19:
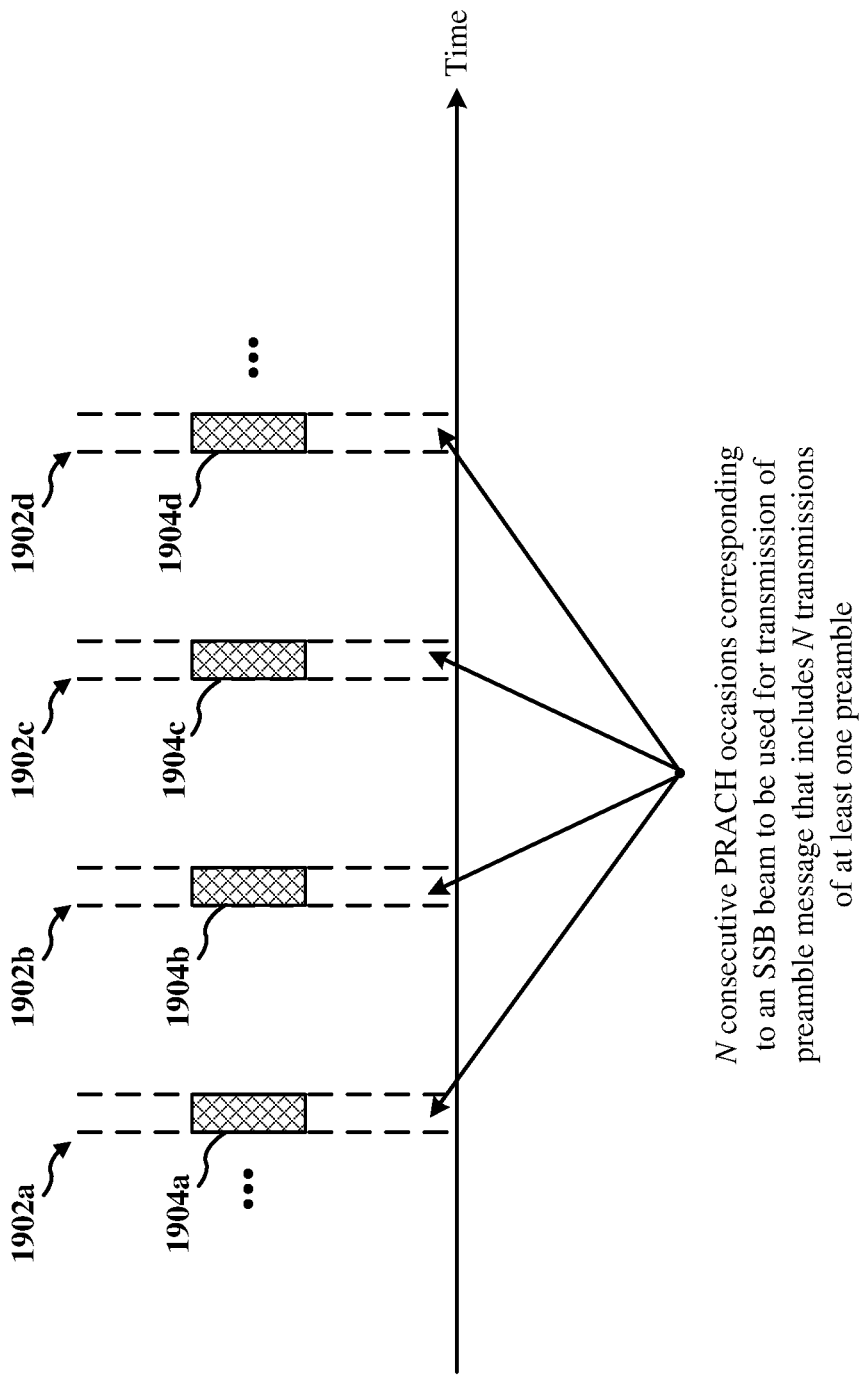
FIG. 19 is a block diagram illustrating RACH occasions for an example repetitive random access message transmission procedure according to some aspects.

Referring to FIG. 19, this figure illustrates an example of repeating the transmission of the random access message (e.g., Msg1) in multiple RACH occasions 1902a-d. In an aspect, FIG. 19 may also represent retransmissions of random access messages after the initial message transmission 1814 if a RAR message 1820a is not received. Each of the RACH occasions 1902a-d may correspond to the same one of the beams 1815 via which one of the SSBs is received (e.g., the SSB beam or beam subset indicated by RMSI as warranting enhanced random access message processes). In this case, the UE 1804 may transmit corresponding preamble messages 1904a-d in each of the multiple RACH occasions 1902a-d. In one aspect, the preamble message 1904 in each of RACH occasions 1902a-d may be the same. For example, the same preamble sequence may be used in each preamble message 1904 in the RACH occasions 1902a-d.

In another aspect, the preamble message 1904 in each of the RACH occasions 1902a-d may be different. However, the preamble messages 1904 in the RACH occasions 1902a-d may be linked together, as the RACH occasions 1902a-d may be grouped (e.g., k=4) as one RACH occasion that may carry the linked preamble messages 1904a-d. For example, the preamble sequences in each of the linked preamble messages 1904a-d in the RACH occasions 1902a-d may be linked.

Referring back to FIG. 18, after the RAR message 1820 is received by the UE 1804, either after an initial or a subsequent repeat transmission of the random access message, the UE may then send a connection request message (also known as message 3 or Msg 3) 1824 to base station 1802. In response, the base station 1802 sends a connection setup message (also known as message 4 or Msg 4) 1826 to the UE 1804 to end the RACH procedure. Once the random access procedure is completed, a dedicated connection may be established between the UE 1804 and the base station 1802 with a dedicated connection ID.

According to various aspects, the UE 1804 may perform a four-step RACH procedure, e.g., in order to initially access the cell provided by the base station 1802, obtain uplink synchronization with the base station 1802, obtain an uplink grant from the base station 1802, etc. In one aspect, the UE 1804 may determine whether to perform a first (e.g., conventional) four-step RACH procedure or an alternative four-step RACH procedure, e.g., as described herein. For example, the UE 1804 may compare the measurement information 1810 (e.g., the RSRP) for at least one SSB to a threshold, such as a preconfigured threshold or a threshold indicated in the system information 1806. If the UE 1804 determines that the measurement information 1810 satisfies (e.g., meets or exceeds) the threshold, then the UE 1804 may determine that the UE 1804 is to perform the first (e.g., conventional) four-step RACH procedure. However, if the UE 1804 determines that the measurement information 1810 fails to satisfy (e.g., is less than) the threshold, then the UE 1804 may determine that the UE 1804 is to perform the alternative four-step RACH procedure as described above in relation to FIGS. 18 and 19.

Figure 20:
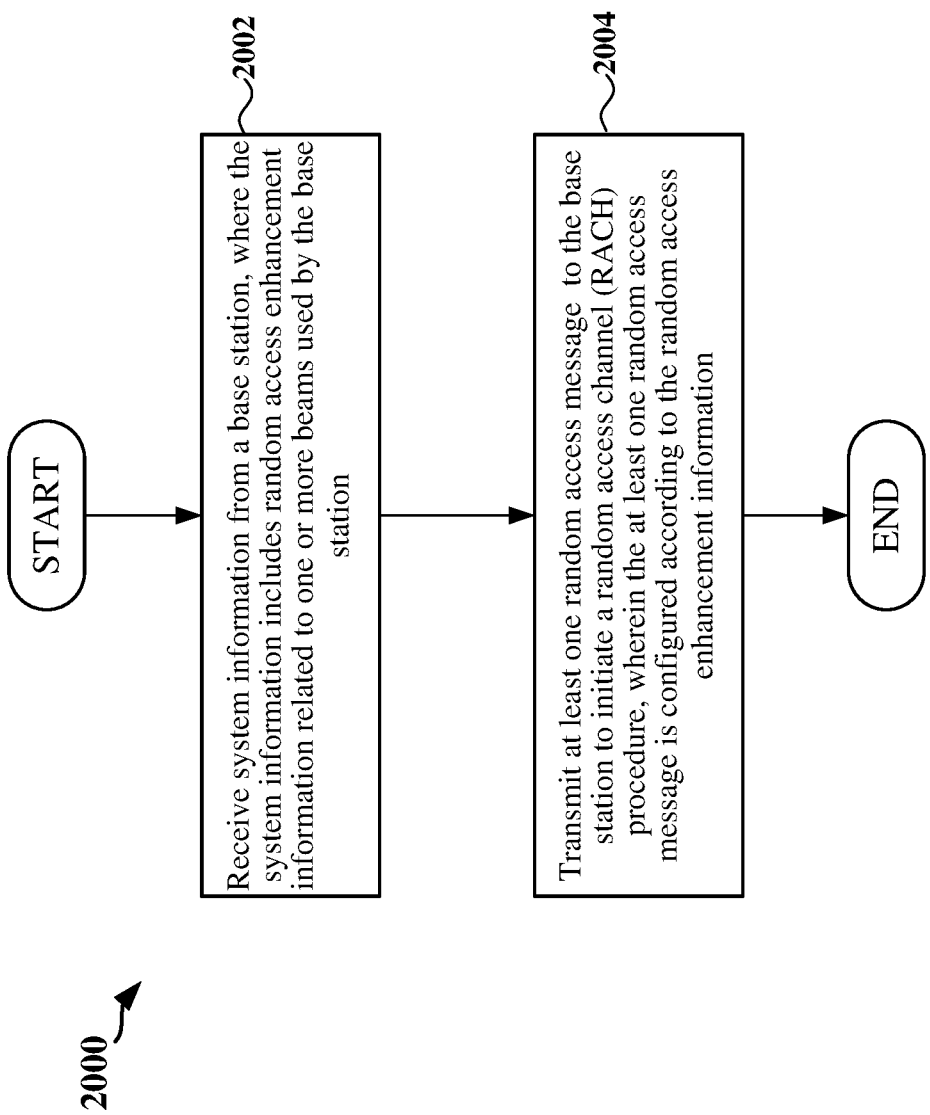
FIG. 20 is a flow chart illustrating an exemplary method for radio link monitoring and link recovery request signaling at a UE according to some aspects.

FIG. 20 is a flow chart of an exemplary method 2000 for a RACH procedure in a UE according to some aspects of the present disclosure. In some examples, the method 2000 may be performed by any scheduled entities or UEs such as illustrated in FIGS. 1-3, 5-7, 10, and 16, or by any suitable means for carrying out the described functions.

At block 2002, a UE can receive system information from a base station, where the system information includes random access enhancement information related to one or more beams used by the base station. The processes of block 2002 may include the measurement and enhancement information determination processes as shown in blocks 1810 and 1812 in FIG. 18. In one aspect, the communication and processing circuitry 1640 can provide a means for receiving the system information via the transceiver 1610 and antennas 1620.

At block 2004, the UE can transmit at least one random access message (e.g., Msg1) to the base station to initiate a random access channel (RACH) procedure, wherein the at least one random access message is configured according to the random access enhancement information as shown in block 2002. In one aspect, the communication and processing circuitry 1640 can provide a means to transmit the at least one random access message via the transceiver 1610 and antennas 1620. In one aspect, the coverage enhancement circuitry 1644 can provide a means to determine whether or not to transmit the at least one random access message that is configured according to the random access enhancement information.

In an example, the process of block 2004 may include determining if the random access enhancement information pertains to a particular SSB beam or a subset of SSB beams and deciding to transmit the random access message (e.g., Msg 1) configured according to the random access enhancement information (e.g., deciding whether random access message enhancement is indicated for the particular SSB beam or subset of beams). In other aspects, the process of block 2004 may include further determining if application of the enhanced random access message configuration is warranted based on whether the frequency range (e.g., FR1 or FR2) is within a particular range or not, the subcarrier spacing, or the number of SSB beams utilized by the base station.

In other examples, method 2000 may further include that the random access message configured according to the random access enhancement information may be repeated a predefined number of times or repetitions. The number of repeat transmissions may be further included within and configured by the random access enhancement information. In another example, the random access message configured according to the random access enhancement information may include a modified formatting of thereof.

In the method 2000, it is further noted that the system information can include RMSI that can include a bit field indicating a beam index corresponding to at least one of the one or more SSB beams. Additionally, the beam index may be configured to indicate a set of beams of the one or more beams on the random access information configured according to the random access enhancement information may be transmitted. In other aspects, the bit field in the RMSI may be configured to indicate a particular random access message configuration option for the random access message configured according to the random access enhancement information from among a number of predefined enhanced random access message configuration options.

According to another example, method 2000 may include the bit field being configured to indicate a number of repetitions of the random access message configured according to the random access enhancement information corresponding to at least one beam of the one or more beams. In another example, method 2000 may include that the bit field is configured to indicate a number of repetitions of the random access message configured according to the random access enhancement information for a corresponding at least one beam of the one or more beams, and the UE may determine whether to transmit the random access message configured according to the random access enhancement information the number of repetitions for the corresponding at least one beam based on a condition whether a RSRP threshold for the at least one beam has been exceeded. Additionally, the RSRP threshold for the at least one beam may be defined from or based on information in the bit field of the RMSI.

According to still other examples, the bit field may be configured to indicate a number of repetitions of the random access message configured according to the random access enhancement information for a corresponding at least one beam of the one or more beams, where the bit field is further configured to indicate a subset of preamble sequences associated with the repetitions that may be used by the UE.

Figure 21:
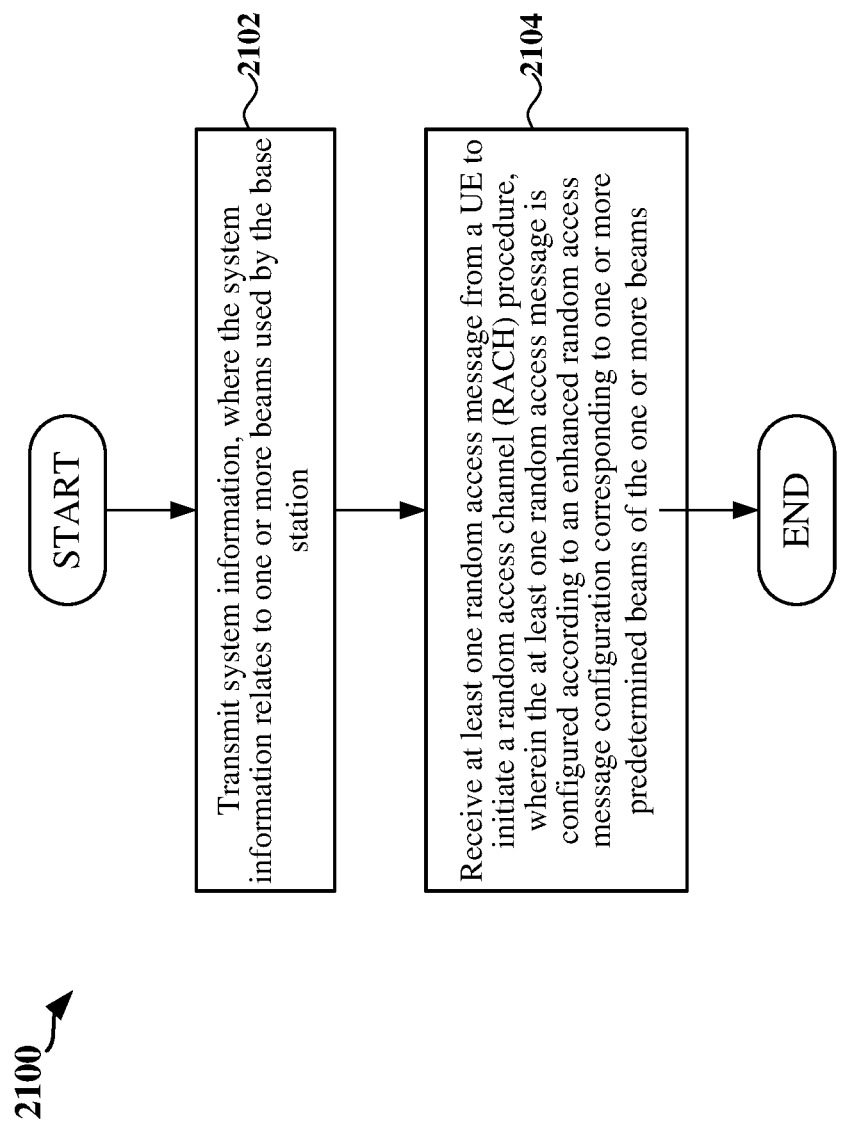
FIG. 21 is a flow chart illustrating another exemplary method for radio link monitoring and link recovery request signaling at a scheduling entity according to some aspects.

FIG. 21 is a flow chart of another method 2100 for initial access and RACH processes according to some aspects. As described below, some or all illustrated features may be omitted in a particular implementation within the scope of the present disclosure, and some illustrated features may not be required for implementation of all implementations. In some examples, the method 2100 may be performed by any of the base stations or scheduling entities illustrated in FIGS. 1-3, 5-7, 10, and 16, for example, by a scheduling entity 1200, as will be described and illustrated in FIG. 12, by a processor or processing system, or by any suitable means for carrying out the described functions.

At block 2102, the scheduling entity can transmit system information to a UE, where the system information relates to one or more beams used by the base station (e.g., SSBs). The system information may include RMSI including at least one bit field that communicates beam-specific information about which beams or beam sets warrant treatment of an enhanced random access message coverage for the UE to transmit a random access message in a RACH procedure, such as was discussed above in connection with FIGS. 18 and 19. In one aspect, the communication and processing circuitry 1240 can provide a means for transmitting the system information via the transceiver 1210 and antennas 1220.

Additionally, at block 2104, the scheduling entity can receive at least one PRACH (e.g., Msg 1) from a user equipment to initiate a RACH procedure, wherein the at least one PRACH is configured according to an enhanced random access message configuration corresponding to one or more predetermined beams of the one or more beams. In some aspects, the system information transmitted by the base station comprises RMSI. In one aspect, the communication and processing circuitry 1240 can provide a means to receive the at least one PRACH via the transceiver 1210 and antennas 1220. Further, the RMSI may be configured by the base station to include an extra bit field (i.e., at least one bit field beyond what is conventionally utilized in RMSI). In other aspects, the bit field may include a beam index corresponding to at least one of the one or more beams, wherein the beam index indicates which beams or set of beams of the one or more beams utilize the enhanced random access message configuration.

Additionally, method 2100 includes that the base station may configure the RMSI bit field to indicate a particular random access message configuration option among a number of predefined enhanced random access message configuration options, such as between an option to repeat transmissions or the modify a format of the random access message as merely two examples and not limited to such. Furthermore, method 2100 may include the base station configuring the RMSI bit field to indicate a number of random access message repetitions used for the enhanced random access message configuration for a corresponding at least one beam of the one or more beams.

Further, method 2100 may include the RMSI bit field configured to indicate a number of random access message repetitions used for the enhanced random access message configuration for a corresponding at least one beam of the one or more beams, and a RSRP threshold for at least one beam of the one or more beams. In yet another example, method 2100 may include that the base station configures the RMSI bit field to indicate a number of random access message repetitions used for the enhanced random access message configuration for a corresponding at least one beam of the one or more beams, wherein the bit field is further configured to indicate a subset of preamble sequences associated with the random access message repetitions that may be used by the UE. Still further, method 2100 may include that the RMSI comprises information configuring use of the enhanced random access message configuration for transmissions based on at least one of a predetermined frequency range, transmissions configured with a predetermined subcarrier spacing, or the use of a predetermined number of SSB beams.

In some aspects, the RACH coverage enhancement techniques described above in relation to FIGS. 1-21 can be used separately or in various combinations.

In a first aspect, a method of wireless communication at a user equipment (UE) is provided. The method comprises receiving, from a scheduling entity, system information in a beam sweep comprising a plurality of beams; identifying, based on the system information, one or more beams of the plurality of beams configured to use a coverage enhancement technique in a random access procedure; and exchanging, with the scheduling entity, at least one random access message associated with the random access procedure on the one or more beams according to the coverage enhancement technique.

In a second aspect, alone or in combination with the first aspect, wherein, the exchanging the at least one random access message comprises, at least one of: transmitting a random access message to the scheduling entity to initiate the random access procedure; or receiving a random access response (RAR) associated with the random access procedure.

In a third aspect, alone or in combination with any of the first to second aspects, wherein the receiving the system information comprises: receiving remaining minimum system information (RMSI) from the scheduling entity, the RMSI including beam-specific information that identifies the one or more beams configured to use the coverage enhancement technique.

In a fourth aspect, alone or in combination with the third aspect, wherein the RMSI comprises at least one of: a bitfield configured to indicate a beam index of each of the one or more beams configured to use the coverage enhancement technique in the random access procedure; a bitfield configured to indicate a number of repetitions of the at least one random access message according to the coverage enhancement technique; or a bitfield configured to indicate the coverage enhancement technique among a plurality of predefined coverage enhancement techniques.

In a fifth aspect, alone or in combination with any of the third to fourth aspects, wherein the RMSI is configured to indicate a time window comprising a plurality of segments for receiving the at least one random access message selectively according to the coverage enhancement technique.

In a sixth aspect, alone or in combination with the fifth aspect, the method further comprises: receiving the at least one random access message in a first segment of the time window using the coverage enhancement technique; and receiving the at least one random access message in a second segment of the time window without using the coverage enhancement technique.

In a seventh aspect, alone or in combination with any of the first to sixth aspects, the method further comprises: receiving, from the scheduling entity, a beam refinement signal prior to receiving the at least one random access message; and refining a beam of the one or more beams for receiving the at least one random access message based on the beam refinement signal.

In an eighth aspect, alone or in combination with any of the first to seventh aspects, the method further comprises, at least one of: receiving a repetition of the at least one random access message on the one or more beams according to the coverage enhancement technique; or transmitting a repetition of the at least one random access message on the one or more beams according to the coverage enhancement technique.

In a ninth aspect, a user equipment (UE) for wireless communication is provided. The UE comprises: a communication interface; a memory; and a processor operatively coupled with the communication interface and the memory, wherein the processor and the memory are configured to: receive, via the communication interface, system information transmitted by a scheduling entity in a beam sweep comprising a plurality of beams; identify, based on the system information, one or more beams of the plurality of beams configured to use a coverage enhancement technique in a random access procedure; and exchange, via the communication interface, with the scheduling entity, at least one random access message associated with the random access procedure on the one or more beams according to the coverage enhancement technique.

In a tenth aspect, alone or in combination with the ninth aspect, wherein, to exchange the at least one random access message, the processor and the memory are further configured to, at least one of: transmit a random access request to the scheduling entity to initiate the random access procedure; or receive a random access response associated with the random access procedure.

In an eleventh aspect, alone or in combination with any of the ninth to tenth aspects, wherein the processor and the memory are further configured to: receive remaining minimum system information (RMSI) from the scheduling entity, the RMSI including beam-specific information that identifies the one or more beams configured to use the coverage enhancement technique.

In a twelfth aspect, alone or in combination with the eleventh aspect, wherein the RMSI comprises at least one of: a bitfield configured to indicate a beam index of each of the one or more beams configured to use the coverage enhancement technique in the random access procedure; a bitfield configured to indicate a number of repetitions of the at least one random access message according to the coverage enhancement technique; or a bitfield configured to indicate the coverage enhancement technique among a plurality of predefined coverage enhancement techniques.

In a thirteenth aspect, alone or in combination with any of the twelfth to thirteenth aspects, wherein the RMSI is configured to indicate a time window comprising a plurality of segments for receiving the at least one random access message selectively using the coverage enhancement technique.

In a fourteenth aspect, alone or in combination with the thirteenth aspect, wherein the processor and the memory are further configured to: receive the at least one random access message in a first segment of the time window using the coverage enhancement technique; and receive the at least one random access message in a second segment of the time window without using the coverage enhancement technique.

In a fifteenth aspect, alone or in combination with any of the first to fourteenth aspects, wherein the processor and the memory are further configured to: receive, from the scheduling entity, a beam refinement signal prior to receiving the at least one random access message; and refine a beam of the one or more beams for receiving the random access message based on the beam refinement signal.

In a sixteenth aspect, alone or in combination with any of the first to fifteenth aspects, wherein the processor and the memory are further configured to, at least one of: receive a repetition of the random access message on the one or more beams according to the coverage enhancement technique; or transmit a repetition of the at least one random access message on the one or more beams according to the coverage enhancement technique.

In a seventh aspect, a method of wireless communication at a scheduling entity is provided. The method comprises: transmitting system information in a beam sweep comprising a plurality of beams, the system information identifying one or more beams of the plurality of beams configured to use a coverage enhancement technique in a random access procedure; receiving, from a user equipment (UE), a random access request associated with the random access procedure; and transmitting, to the UE, a random access response (RAR) associated with the random access procedure, wherein at least one of the random access request or the RAR is configured according to the coverage enhancement technique corresponding to the one or more beams.

In an eighteenth aspect, alone or in combination with the seventeenth aspect, wherein the transmitting system information comprises: transmitting remaining minimum system information (RMSI) to the UE, the RMSI including beam-specific information that identifies the one or more beams configured to use the coverage enhancement technique.

In a nineteenth aspect, alone or in combination with the eighteenth aspect, wherein the RMSI comprises, at least one of: a bitfield configured to indicate a beam index of each of the one or more beams configured to use the coverage enhancement technique in the random access procedure; a bitfield configured to indicate a number of repetitions of the random access request according to the coverage enhancement technique; a bitfield configured to indicate a number of repetitions of the RAR using according to the coverage enhancement technique; or a bitfield configured to indicate the coverage enhancement technique among a plurality of predefined coverage enhancement techniques.

In a twentieth aspect, alone or in combination with any of the seventeenth to nineteenth aspects, wherein the RMSI is configured to indicate a RAR window comprising a plurality of segments for receiving the RAR selectively using the coverage enhancement technique.

In a twenty-first aspect, alone or in combination with the twentieth aspect, the method further comprises: transmitting the RAR in a first segment of the RAR window using the coverage enhancement technique; and transmitting the RAR in a second segment of the RAR window without using the coverage enhancement technique.

In a twenty-second aspect, alone or in combination with any of the seventeenth to twenty-first aspects, the method further comprises: transmitting a beam refinement signal for facilitating beam refinement prior to transmitting the RAR associated with the random access procedure.

In a twenty-third aspect, alone or in combination with any of the seventeenth to twenty-second aspects, the method further comprises, at least one of: receiving a repetition of the random access request on the one or more beams according to the coverage enhancement technique; or transmitting a repetition of the RAR on the one or more beams according to the coverage enhancement technique.

In a twenty-four aspect, a scheduling entity for wireless communication is provided. The scheduling entity comprises: a communication interface; a memory; and a processor operatively coupled with the communication interface and the memory, wherein the processor and the memory are configured to: transmit, via the communication interface, system information in a beam sweep comprising a plurality of beams, the system information identifying one or more beams of the plurality of beams configured to use a coverage enhancement technique in a random access procedure; receive, via the communication interface, from a user equipment (UE), a random access request associated with the random access procedure; and transmit, via the communication interface to the UE, a random access response (RAR) associated with the random access procedure, wherein at least one of the random access request or the RAR is configured according to the coverage enhancement technique corresponding to the one or more beams.

In a twenty-fifth aspect, alone or in combination with the twenty-four aspect, wherein the processor and the memory are further configured to: transmit remaining minimum system information (RMSI) to the UE, the RMSI including beam-specific information that identifies the one or more beams configured to use the coverage enhancement technique.

In a twenty-sixth aspect, alone or in combination with the twenty-fifth aspect, wherein the RMSI comprises at least one of: a bitfield configured to indicate a beam index of each of the one or more beams configured to use the coverage enhancement technique in the random access procedure; a bitfield configured to indicate a number of repetitions of the random access request according to the coverage enhancement technique; a bitfield configured to indicate a number of repetitions of the RAR according to the coverage enhancement technique; or a bitfield configured to indicate the coverage enhancement technique among a plurality of predefined coverage enhancement techniques.

In a twenty-seventh aspect, alone or in combination with any of the twenty-fifth to twenty-sixth aspects, wherein the RMSI is configured to indicate a RAR window comprising a plurality of segments for receiving the RAR selectively using the coverage enhancement technique.

In a twenty-eighth aspect, alone or in combination with any of the twenty-seventh aspect, wherein the processor and the memory are further configured to: transmit the RAR in a first segment of the RAR window using the coverage enhancement technique; and transmit the RAR in a second segment of the RAR window without using the coverage enhancement technique.

In a twenty-ninth aspect, alone or in combination with any of the twenty-fourth to twenty-eighth aspects, wherein the processor and the memory are further configured to: transmit a beam refinement signal for beam refinement prior to transmitting the RAR associated with a random access procedure.

In a thirtieth aspect, alone or in combination with any of the twenty-fourth to twenty-eighth aspects, wherein the processor and the memory are further configured to, at least one of: receiving a repetition of the random access request on the one or more beams according to the coverage enhancement technique; or transmit a repetition of the RAR on the one or more beams according to the coverage enhancement technique.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-21 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:
   receiving, from a scheduling entity, remaining minimum system information (RMSI) in a beam sweep comprising a plurality of beams wherein the RMSI includes beam-specific information and indicates a time window comprising a plurality of segments;
   identifying, based on the RMSI, one or more beams of the plurality of beams wherein a coverage enhancement technique is applicable to the identified one or more beams for-a random access procedure;
   receiving at least one random access message in a first segment of the time window using the coverage enhancement technique wherein the coverage enhancement technique comprises a repetition of the at least one random access message on at least one of the identified one or more beams; and
   receiving the at least one random access message in a second segment of the time window without using the coverage enhancement technique.

2. The method of claim 1, further comprising:
   transmitting a random access request to the scheduling entity to initiate the random access procedure.

3. The method of claim 1, wherein the RMSI comprises at least one of:
   a bitfield configured to indicate a beam index of each of the one or more beams configured to use the coverage enhancement technique in the random access procedure;
   a bitfield configured to indicate the number of repetitions of the at least one random access message according to the coverage enhancement technique; or
   a bitfield configured to indicate the coverage enhancement technique among a plurality of predefined coverage enhancement techniques.

4. The method of claim 1, further comprising:
   receiving, from the scheduling entity, a beam refinement signal prior to receiving the at least one random access message; and
   refining a beam of the one or more beams for receiving the at least one random access message based on the beam refinement signal.

5. The method of claim 1, further comprising, at least one of:
   receiving a repetition of the at least one random access message on the one or more beams according to the coverage enhancement technique; or
   transmitting a repetition of the at least one random access message on the one or more beams according to the coverage enhancement technique.

6. A user equipment (UE) for wireless communication, comprising:
   a communication interface;
   a memory; and
   a processor operatively coupled with the communication interface and the memory,
   wherein the processor and the memory are configured to:
      receive, via the communication interface, remaining minimum system information (RMSI) transmitted by a scheduling entity in a beam sweep comprising a plurality of beams, wherein the RMSI includes beam-specific information and indicates a time window comprising a plurality of segments;

identify, based on the system information, one or more beams of the plurality of beams wherein a coverage enhancement technique is applicable to the identified one or more beams for a random access procedure; and receiving at least one random access message in a first segment of the time window using the coverage enhancement technique wherein the coverage enhancement technique comprises a repetition of the at least one random access message on at least one of the identified one or more beams; and receive the at least one random access message in a second segment of the time window without using the coverage enhancement technique.

7. The UE of claim 6, wherein the processor and the memory are configured to:

transmit a random access request to the scheduling entity to initiate the random access procedure.

8. The UE of claim 6, wherein the RMSI comprises at least one of:

a bitfield configured to indicate a beam index of each of the one or more beams configured to use the coverage enhancement technique in the random access procedure;

a bitfield configured to indicate the number of repetitions of the at least one random access message according to the coverage enhancement technique; or a bitfield configured to indicate the coverage enhancement technique among a plurality of predefined coverage enhancement techniques.

9. The UE of claim 6, wherein the processor and the memory are further configured to:

receive, from the scheduling entity, a beam refinement signal prior to receiving the at least one random access message; and refine a beam of the one or more beams for receiving the random access message based on the beam refinement signal.

10. The UE of claim 6, wherein the processor and the memory are further configured to, at least one of:

receive a repetition of the random access message on the one or more beams according to the coverage enhancement technique; or transmit a repetition of the at least one random access message on the one or more beams according to the coverage enhancement technique.

11. A method of wireless communication at a scheduling entity, comprising:

transmitting remaining minimum system information (RMSI) in a beam sweep comprising a plurality of beams, the RMSI identifying one or more beams of the plurality of beams wherein a coverage enhancement technique is applicable to the identified one or more beams in a random access procedure and wherein the RMSI indicates a time window comprising a plurality of segments;

receiving, from a user equipment (UE), a random access request associated with the random access procedure; and transmitting, to the UE, a random access response (RAR) associated with the random access procedure in a first segment of the time window using the coverage enhancement technique wherein the coverage enhancement technique comprises a repetition of the RAR on at least one of the identified one or more beams; and transmitting the RAR in a second segment of the RAR window without using the coverage enhancement technique.

12. The method of claim 11, wherein the RMSI comprises, at least one of:

a bitfield configured to indicate a beam index of each of the one or more beams configured to use the coverage enhancement technique in the random access procedure;

a bitfield configured to indicate the number of repetitions of the random access request according to the coverage enhancement technique;

a bitfield configured to indicate a number of repetitions of the RAR using according to the coverage enhancement technique; or a bitfield configured to indicate the coverage enhancement technique among a plurality of predefined coverage enhancement techniques.

13. The method of claim 11, further comprising:

transmitting a beam refinement signal for facilitating beam refinement prior to transmitting the RAR associated with the random access procedure.

14. The method of claim 11, further comprising, at least one of:

receiving a repetition of the random access request on the one or more beams according to the coverage enhancement technique; or transmitting a repetition of the RAR on the one or more beams according to the coverage enhancement technique.

15. A scheduling entity for wireless communication, comprising:

a communication interface;

a memory; and a processor operatively coupled with the communication interface and the memory, wherein the processor and the memory are configured to:

transmit, via the communication interface, remaining minimum system information (RMSI) in a beam sweep comprising a plurality of beams, the RMSI identifying one or more beams of the plurality of beams wherein a coverage enhancement technique is applicable to the identified one or more beams and the coverage enhancement technique is beam-specific in a random access procedure and wherein the RMSI indicates a time window comprising a plurality of segments;

receive, via the communication interface, from a user equipment (UE), a random access request associated with the random access procedure; and transmit, via the communication interface to the UE, a random access response (RAR) associated with the random access procedure in a first segment of the RAR time window using the coverage enhancement technique wherein the coverage enhancement technique comprises a repetition of the RAR on at least one of the identified one or more beams; and transmit the RAR in a second segment of the RAR window without using the coverage enhancement technique.

16. The scheduling entity of claim 15, wherein the RMSI comprises at least one of:

a bitfield configured to indicate a beam index of each of the one or more beams configured to use the coverage enhancement technique in the random access procedure;

a bitfield configured to indicate the number of repetitions of the random access request according to the coverage enhancement technique;
 a bitfield configured to indicate a number of repetitions of the RAR according to the coverage enhancement technique; or
 a bitfield configured to indicate the coverage enhancement technique among a plurality of predefined coverage enhancement techniques.

17. The scheduling entity of claim 15, wherein the processor and the memory are further configured to:
 transmit a beam refinement signal for beam refinement prior to transmitting the RAR associated with a random access procedure.

18. The scheduling entity of claim 15, wherein the processor and the memory are further configured to, at least one of:
 receiving a repetition of the random access request on the one or more beams according to the coverage enhancement technique; or
 transmit a repetition of the RAR on the one or more beams according to the coverage enhancement technique.

\* \* \* \* \*